(12) United States Patent
Chang et al.

(10) Patent No.: US 12,450,527 B2
(45) Date of Patent: Oct. 21, 2025

(54) UTILIZING PROVIDER DEVICE EFFICIENCY METRICS TO SELECT A PROVIDER DEVICE FOR A FUTURE TIME WINDOW

(71) Applicant: Lyft, Inc., San Francisco, CA (US)

(72) Inventors: Michael Kae-Uei Chang, San Francisco, CA (US); David Florian Kayode Ikuye, San Francisco, CA (US); Keshav Puranmalka, Seattle, WA (US); Dan Xiaoyu Yu, San Francisco, CA (US); Conglei Zhang, Daly City, CA (US)

(73) Assignee: Lyft, Inc., San Francisco, CA (US)

( * ) Notice: Subject to any disclaimer, the term of this patent is extended or adjusted under 35 U.S.C. 154(b) by 981 days.

(21) Appl. No.: 17/014,788

(22) Filed: Sep. 8, 2020

(65) Prior Publication Data
US 2022/0076170 A1    Mar. 10, 2022

(51) Int. Cl.
*G06Q 10/02*        (2012.01)
*G06Q 10/04*        (2023.01)
(Continued)

(52) U.S. Cl.
CPC .............. *G06Q 10/02* (2013.01); *G06Q 10/04* (2013.01); *G06Q 10/06316* (2013.01);
(Continued)

(58) Field of Classification Search
CPC ........ G06Q 10/02; G06Q 50/47; G06Q 10/04; G06Q 10/06316; G06Q 10/06393; G06Q 50/40; G08G 1/202
(Continued)

(56) References Cited

U.S. PATENT DOCUMENTS 11,574,263 B2 *   2/2023   Shoval .............. G01C 21/3492
2015/0356501 A1 * 12/2015  Gorjestani ......... G06Q 10/0833
                                                      705/333
(Continued)

FOREIGN PATENT DOCUMENTS

CN          110969280 A1      4/2020
WO      WO-2019083528 A1 *    5/2019   ......... G01C 21/3484

OTHER PUBLICATIONS

Wang, Jun and Wang, Xiaolei, "Predicting the matching probability and the expected ride/shared distance for each dynamic ride-pooling order: A mathematical modeling approach", December 2021 Transportation Research Part B Methodological 154(2):125-146 (Year: 2021).*

(Continued)

*Primary Examiner* — Shannon S Campbell
*Assistant Examiner* — Freda A Nelson
(74) *Attorney, Agent, or Firm* — Keller Preece PLLC

(57) ABSTRACT

The present disclosure relates to systems, non-transitory computer readable media, and methods that provide graphical user interfaces comprising future transportation options with varying time windows at different transportation values and dynamically analyze the time windows to identify provider devices to fulfill transportation requests based on provider device efficiency metrics. For instance, the disclosed systems can delay selection of a provider device within a future time window utilizing a dynamic threshold provider device efficiency metric. For instance, the disclosed systems can analyze historical distributions of provider devices to generate a transition probability matrix that is utilized to analyze current provider devices and determine a threshold provider device efficiency metric that reflects the likelihood of identifying more efficient matches in the future. The disclosed systems can compare the determined threshold to anticipated efficiency metrics for individual (Continued)

provider devices to generate matches for digital transportation requests.

20 Claims, 14 Drawing Sheets

(51) Int. Cl.
 *G06Q 10/0631* (2023.01)
 *G06Q 10/0639* (2023.01)
 *G06Q 50/47* (2024.01)
 *G08G 1/00* (2006.01)
 *G06Q 50/40* (2024.01)

(52) U.S. Cl.
 CPC ....... *G06Q 10/06393* (2013.01); *G06Q 50/47* (2024.01); *G08G 1/202* (2013.01); *G06Q 50/40* (2024.01)

(58) Field of Classification Search
 USPC ................................................ 705/5, 6, 333
 See application file for complete search history.

(56) References Cited

U.S. PATENT DOCUMENTS

| | | |
|---|---|---|
| 2017/0228666 A1 | 8/2017 | Bauer |
| 2018/0224866 A1* | 8/2018 | Alonso-Mora ...... G05D 1/0291 |
| 2020/0151624 A1 | 5/2020 | Sierra et al. |
| 2020/0175632 A1* | 6/2020 | Vora ................. G06Q 10/06315 |
| 2020/0249047 A1* | 8/2020 | Balva ................. G01C 21/3438 |
| 2020/0265348 A1* | 8/2020 | Nimesh .............. G01C 21/3492 |
| 2020/0279195 A1 | 9/2020 | Kobori et al. |
| 2020/0300645 A1* | 9/2020 | Schirano ............ G01C 21/3676 |
| 2021/0027235 A1* | 1/2021 | Zhang .................... G06Q 50/40 |
| 2021/0042668 A1 | 2/2021 | Gao et al. |
| 2021/0192584 A1* | 6/2021 | Spielman ............. G06Q 10/047 |

OTHER PUBLICATIONS

Govind Pramod Yatnalkar, "A Machine Learning Recommender Model for Ride Sharing Based on Rider Characteristics and User Threshold Time", 2019, Marshall Digital Scholar, 93 pages. (Year: 2019).*
U.S. Appl. No. 17/810,708, filed Jul. 5, 2022, Bishoff et al.
Lyft; "Wait & Save: The Most Affordable Lyft Ride for Households and Individuals"; May 5, 2020; https://www.lyft.com/blog/posts/wait-and-save.
U.S. Appl. No. 17/810,708, dated May 14, 2025, Office Action.
U.S. Appl. No. 19/216,363, dated Jul 15, 2025, Office Action.
U.S. Appl. No. 17/810,708, dated Aug. 27, 2025, Office Action.

* cited by examiner

UTILIZING PROVIDER DEVICE EFFICIENCY METRICS TO SELECT A PROVIDER DEVICE FOR A FUTURE TIME WINDOW

BACKGROUND

In recent years, transportation matching systems have introduced significant technological improvements in mobile app-based matching of transportation providers and requestors. Indeed, the proliferation of web and mobile applications enable requesting computer devices to submit transportation requests via on-demand transportation matching systems. On-demand transportation matching systems can identify available provider computing devices that can provide transportation services from one geographic location to another and efficiently identify digital matches between provider computing devices and requestor computing devices. Although conventional transportation matching systems can match requesting computing devices with provider computing devices, conventional systems often face a number of technical problems, particularly with respect to flexibility of operation and efficiency of implementing computing devices.

SUMMARY

One or more embodiments provide benefits and/or solve one or more of the foregoing or other problems in the art with systems, methods, and non-transitory computer readable storage media that provide graphical user interfaces comprising future transportation options with varying time windows at different transportation values and then dynamically analyze the time windows to flexibly identify provider devices to fulfill transportation requests based on provider device efficiency metrics. In particular, based on receiving a ride request, the disclosed systems can dynamically determine a future time window in which the requestor device may expect arrival of a provider device. The disclosed systems can present various transportation options within graphical user interfaces of requestor devices including an option with a fixed arrival time and also an option reflecting the future time window to improve efficiency of implementing systems. For example, based on detecting that the requestor has selected the future time window option, the disclosed system determines a variable threshold provider device efficiency metric for identifying a provider vehicle. In particular, the disclosed systems can determine the threshold provider device efficiency metric based on the future time window, the historic data, and current provider device conditions. As time progresses, the disclosed systems can dynamically modify the threshold provider device efficiency metric to determine a transportation match within the identified time window. By utilizing dynamic threshold provider device efficiency metrics tied to future time windows selected via graphical user interfaces of requestor devices, the disclosed systems can flexibly and efficiently identify provider devices to respond to digital transportation request while improving provider device efficiency metrics.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings which are summarized below.

DETAILED DESCRIPTION

Figure 1:
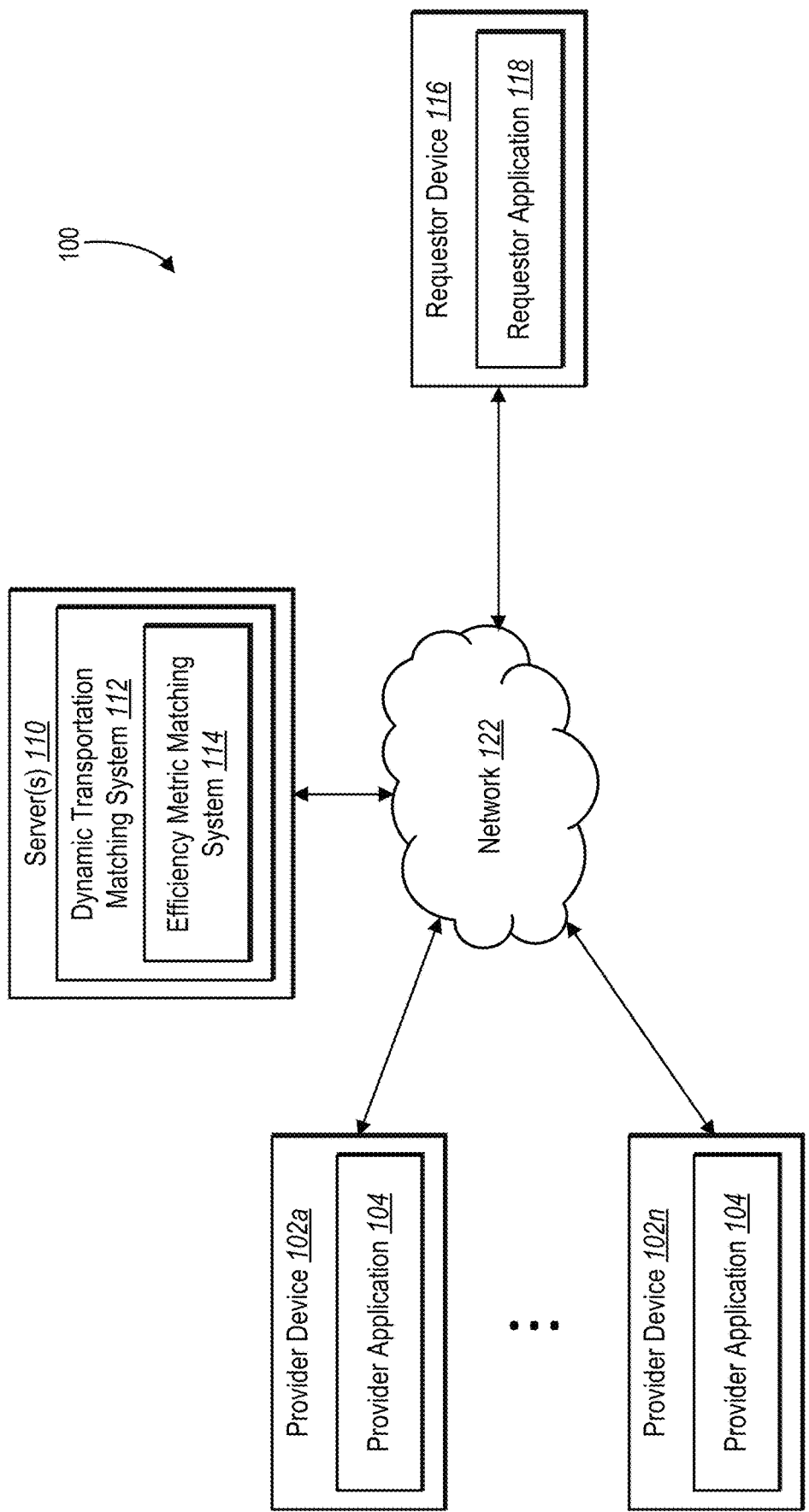
FIG. 1 illustrates an environment in which an efficiency metric matching system can operate in accordance with one or more embodiments of the present disclosure.

One or more embodiments of the present disclosure include an efficiency metric matching system that provides graphical user interfaces comprising future transportation options with varying time windows at different transportation values and then utilizes dynamic threshold provider device efficiency metrics to select provider devices to efficiently fulfill a transportation requests within a selected time window. The efficiency metric matching system can analyze data corresponding to a location associated with a transportation request to determine the future time window for a requestor. The efficiency metric matching system can provide, to the requestor, various transportation options including an option comprising an estimated arrival time (e.g., drop off time and/or pick up time) and an option associated with the future time window. Based on selection of the option associated with the future time window, the efficiency metric matching system can dynamically analyze the future time window, current provider devices, and historical data to determine different threshold provider device efficiency metrics overtime. Utilizing these threshold provider device efficiency metrics, the efficiency metric matching system can determine to, at any given moment, dispatch a current provider device to fulfill the transportation or wait to dispatch a provider device at a future time to fulfill the request within the future time window.

To illustrate, in one or more embodiments, the efficiency metric matching system receives, from a requestor device, an indication of a transportation request corresponding to a location. The efficiency metric matching system can analyze characteristics corresponding to the location to determine a future time window to fulfill the transportation request (e.g., a future time window for arrival of the provider device). The efficiency metric matching system can provide, for display at the requestor device, a first transportation option comprising an arrival time and a second transportation option comprising the future time window. In response to selection of the second transportation option, the efficiency metric matching system can determine a threshold provider device efficiency metric based on the future time window, current provider devices, and a historical distribution of provider devices. The efficiency metric matching system may select a provider device to fulfill the transportation request within the future time window by comparing predicted provider device efficiency metrics for the current provider devices with the threshold provider device efficiency metric.

As mentioned, the efficiency metric matching system can determine a future time window by analyzing characteristics corresponding to a location. In particular, the efficiency metric matching system can determine future time windows with varied length dependent on conditions specific to the location. In at least one embodiment, the efficiency metric matching system can determine the future time window by analyzing region characteristics indicating a density of points within a region. For example, the efficiency metric matching system can determine a future time window with a longer duration if points within a region are located far apart. Additionally, the efficiency metric matching system can determine device balance measure characteristics indicating current/historical requestor devices and current/historical provider devices corresponding to the location, or other types of region characteristics. Thus, the efficiency metric matching system can determine future time windows specific to a location associated with a transportation request.

The efficiency metric matching system can provide the determined future time window for display via a transportation user interface of the requestor device. More specifically, the efficiency metric matching system can provide the first transportation option comprising an arrival time (e.g., a drop-off time) and a first transportation value alongside the second transportation option comprising the future time window and a second transportation value. Thus, by providing both transportation options and corresponding information, the efficiency metric matching system provides a comparison of various transportation options.

As mentioned above, upon selection of a future time window, the efficiency metric matching system can determine a provider device to fulfill the transportation request based on a transportation efficiency metric. In particular, the efficiency metric matching system can determine a dynamic threshold provider device efficiency metric to select a provider device. For example, the threshold provider device efficiency metric can comprise a threshold (e.g., maximum) amount of time that a provider device will travel to fulfill a transportation request without a passenger.

As part of determining a threshold provider device efficiency metric, the efficiency metric matching system can determine and analyze various time cycles. In particular, the efficiency metric matching system can determine a dispatch deadline indicating a time at which the efficiency metric matching system must select and dispatch a provider device within the future time window. The efficiency metric matching system can determine time cycles within the pickup window before the dispatch deadline. At each time cycle, the efficiency metric matching system can determine a threshold provider device efficiency metric.

As mentioned, the efficiency metric matching system can determine a threshold provider device efficiency metric based on current provider devices and a historical distribution of provider devices. More specifically, the efficiency metric matching system can create a transition probability matrix based on the historical distribution of provider devices. The transition probability matrix can indicate the probabilities of changing provider device efficiency metrics between time cycles. Thus, the efficiency metric matching system can determine threshold provider device efficiency metrics for time cycles within a pickup window corresponding to the future time window based on historical data (and the likelihood of identifying a more efficient match by waiting for a later time instance).

The efficiency metric matching system can select a provider device to fulfill the transportation request within the future time window. In particular, the efficiency metric matching system can compare predicted provider device efficiency metrics of current provider devices with the threshold provider device efficiency metric. Generally, the efficiency metric matching system utilizes the threshold provider device efficiency metric to determine whether to dispatch a provider device within the current time cycle or wait to dispatch a provider device in a future time cycle. For instance, in a given time cycle, the efficiency metric matching system can select a provider device to fulfill a transportation request based on determining that a provider device efficiency metric corresponding to the provider device satisfies the threshold provider device efficiency metric.

By utilizing a dynamic threshold provider device efficiency metric, the efficiency metric matching system can identify more efficient provider devices that would otherwise be ignored or excluded from a matching algorithm (while still matching a provider device within a selected time window). For example, based on a requestor device selecting a future time window, the efficiency metric matching system can intelligently delay generating a transportation match based on the likelihood of more efficient matches arising in the future. For example, the efficiency metric matching system can match a driver at the beginning of the time window in the event there is a match with a provider device efficiency metric that the system predicts is a historically efficient match (or the efficiency metric matching system can continue to wait for a better match based on determining it is likely a better match will appear prior to the end of the time window). Thus, for example, the efficiency metric matching system can delay a match until identifying a provider device currently fulfilling another transportation request that will naturally and efficiently lead to the region of the requestor device within the future time window.

Although conventional transportation matching systems can match requesting computing devices with provider computing devices, conventional systems often face a number of technical problems, particularly with respect to flexibility of operation and efficiency of implementing computing devices. In particular, conventional transportation matching systems frequently utilize fixed or inflexible methods for matching provider vehicles with requestors. For instance, many conventional systems rigidly rely on computer implemented algorithms for immediately matching available provider vehicles and requestors. Focusing rigidly on immediately matching provider vehicles with requestors often results in inefficient utilization of provider vehicles. For example, conventional systems often require provider vehicles to travel long distances to pick up requestors. Thus, conventional transportation matching systems often suffer from limited flexibility of operation.

Due, in part, to inflexibility of operation, conventional transportation matching systems are often inefficient in providing transportation options. For example, conventional systems often display limited transportation options to a requestor device. These limited options often require users to multiply digital transmissions and user interactions leading to inefficiencies in utilization of computer processing resources. For example, utilizing conventional systems, a requestor device that seeks to initiate a transportation request at a later time must either repeatedly check a transportation application for provider devices that will arrive at the later time or interact with a variety of additional user interfaces to submit a request for a later digital transportation request.

Additionally, conventional transportation matching systems often operate inefficiently in matching provider devices and requestor devices. In particular, conventional systems often inefficiently utilize time, communication, and computing resources when matching provider vehicles with requestors. For instance, many conventional transportation matching systems generate inefficient matches that require significant time for provider devices to travel to requestor devices (and significant time for requestor devices to wait for provider devices). This additional waiting time translates to additional and excessive network bandwidth and utilization of computational resources. Indeed, each additional minute of inefficient time translates to multiple different queries from requestor devices (e.g., updates regarding provider device locations, duplicate digital transportation requests, queries regarding other transportation options, etc.), and provider devices (e.g., navigational queries, queries regarding alternative pickup options, etc.). Moreover, excessive travel/waiting time often results in additional digital cancellations, which leads to duplicate network traffic and computational processing (e.g., additional requests from requestor devices, communication with provider devices, and server resources in identifying duplicate matches and coordinating transportation services).

The efficiency metric matching system provides several technical benefits relative to conventional systems. For example, the efficiency metric matching system can improve flexibility of operation relative to conventional systems. In particular, the efficiency metric matching system can flexibly utilize various approaches for selecting a provider device to fulfill a transportation request. Thus, in contrast to conventional systems that rigidly focus on immediately identifying transportation matches, the efficiency metric matching system can determine a future time window in which to fulfill a transportation request and delay the selection of a provider device. More specifically, instead of immediately selecting a provider device at the time of the transportation request, the efficiency metric matching system can flexibly select a provider device during time cycles within a time window.

Additionally, the efficiency metric matching system can improve efficiency relative to conventional systems by improving user interfaces. In particular, as mentioned, the efficiency metric matching system can provide a transportation user interface via the requestor device that includes a first transportation option comprising an immediate drop-off time and additional transportation options with future time windows (and different transportation values). Thus, the efficiency metric matching system can provide, within a single user interface, various transportation options associated with varying levels of flexibility. Furthermore, the efficiency metric matching system can provide, within the transportation user interface, additional information corresponding to the transportation options including transportation values. In this manner, the efficiency metric matching system can reduce the number of user interfaces, the amount of user interaction, and the processing resources required.

The efficiency metric matching system can also provide other improvements to efficient operations relative to conventional systems. Generally, the efficiency metric matching system can more efficiently utilize computing, time, and communication resources by providing additional flexible transportation options. More specifically, the efficiency metric matching system can reduce computing inefficiencies corresponding to unnecessary travel time and unexpected wait times. Indeed by providing additional transportation options with future time windows, the efficiency metric matching system can select provider devices with significantly lower times, which can significantly reduce unnecessary communications bandwidth, queries, and processing resources. Furthermore, the efficiency metric matching system can significantly reduce the number of digital rejections and/or cancellations from requestor devices and provider devices, which further reduces the numbers of queries, status update requests, and other digital communication that strain network bandwidth and processing resources. In addition, by reducing cancellations, the efficiency metric matching system can further improve utilization of computational resources required to determine transportation matches by avoiding duplicate and unnecessary computer matching processes.

As illustrated by the foregoing discussion, the present disclosure utilizes a variety of terms to describe features and advantages of the efficiency metric matching system. Additional detail is now provided regarding the meaning of such terms. For example, as used herein, the term "transportation request" refers to a request from a requesting device (i.e., a requestor device) for transport by a transportation vehicle. In particular, a transportation request includes a request for a transportation vehicle to transport a requestor or a group of individuals from one geographic area to another geographic area. A transportation request can include information such as a pickup location, a destination location (e.g., a location to which the requestor wishes to travel), a request location (e.g., a location from which the transportation request is initiated), location profile information, a requestor rating, or a travel history. As an example of such information, a transportation request may include an address as a destination location and the requestor's current location as the pickup location. A transportation request can also include a requestor device initiating a session via a transportation matching application and transmitting a current location (thus, indicating a desire to receive transportation services from the current location).

As used herein, the term "future time window" refers to a period between a start and an end time between which a provider device fulfills a transportation request (e.g., provides transportation services). In particular, the future time window can include a period of time in which a provider vehicle associated with the provider device drops the requestor device off at a destination location. In some embodiments, the future time window can include a period of time in which a provider vehicle picks up a requestor device from a pick-up location (e.g., a pickup window). For example, a future time window can comprise a start time (e.g., 6:20 pm) and an end time (e.g., 6:30 pm) between which the provider device and the requestor device will arrive at the destination location.

As used herein, the term "arrival time" refers to a time at which a provider device fulfills a transportation request. In particular, the arrival time can include a fixed time at which a provider vehicle associated with the provider device drops the requestor off at a destination location. In some embodiments, the arrival time includes a fixed time at which the provider vehicle picks up a requestor device from a pick-up location. For example, an arrival time can comprise a time (e.g., 6:10 pm) at which the provider device and the requestor device will arrive at the destination location.

As used herein, the term "transportation option" refers to a selectable user interface element corresponding to a set of characteristics or features for transportation services. In particular, a transportation option can include a selectable user interface element corresponding to a particular type of vehicle, a particular pick up time, a particular drop-off time, a particular transportation duration, a particular transportation value, etc. Transportation options can have a variety of different characteristics. For instance, while some transportation options can involve single-requestor provider vehicles while other transportation options involve shared provider vehicles. Additionally, transportation options may comprise different types of drop-off times. For example, a first transportation option can comprise a fixed drop-off time (e.g., 5:20 pm) and a second transportation option can comprise a future time window (e.g., 5:30-5:50 pm). Relatedly, transportation options are associated with transportation values. In particular, transportation values comprise the cost corresponding to a particular transportation option. For example, the transportation value associated with the first transportation option mentioned above may be higher than the transportation value associated with the second transportation option.

As used herein, the term "provider device efficiency metric" refers to a measure of utilization of provider device resources. To illustrate, provider device efficiency metric can include a measure of time that a provider device does not have a passenger (e.g., P1 time), a measure of time that a provider device is travelling to pick up a passenger (e.g., P2 time), and/or a measure of time that a provider device is transporting a passenger (e.g., P3 time). For example, the provider device efficiency metric can comprise a time (e.g., 2, 5, 10 minutes, etc.) that a provider device is without a passenger prior to fulfilling a transportation request. In other words, the provider device efficiency metric can include the time between when a provider device indicates dropping off a first passenger and picking up a second passenger.

As used herein, the term "current provider devices" refers to active (e.g., online or logged in) provider devices at a given time instance. In particular, current provider devices comprise provider devices that are online and available to fulfill a transportation request. Current provider devices comprise both provider devices that are not currently fulfilling transportation requests and also provider devices that are fulfilling transportation requests (but are available to fulfill a different transportation request within a future time window). For example, a current provider device can comprise a provider device that is, at a given moment, transporting a first passenger to a destination location but can pick up a second passenger at a pickup location within a future time window.

As used herein, the term "historical distribution of provider devices" refers to a statistical representation of historical provider device values. For example, the historical distribution of provider devices reflects available provider devices over time. More specifically, the historical distribution of provider devices indicates the probabilities of number of online provider devices over time. For example, a historical distribution of provider devices may be represented as a function or table of values that maps predicted numbers of available provider devices to time. A historical distribution of provider devices can be specific to a particular geographic region (e.g., neighborhood, city, etc.).

As used herein, the term "dispatch deadline" refers to a time at which a dynamic transportation matching system dispatches a provider device to meet requestor device pick up criteria. In particular, a dispatch deadline can comprise a time within a future time window at which a dynamic transportation matching system must send a provider device to pick up a requestor device by a target pickup time. For instance, the dispatch deadline can include a time (e.g., 5:55 pm) at which the dynamic transportation matching system must dispatch the closest or fastest available provider device to pick up a requestor device by the end time of a predicted pickup window.

As indicated above, this disclosure includes illustrative figures portraying example embodiments and implementations of the efficiency metric matching system. In accordance with one or more embodiments, FIG. 1 illustrates a schematic diagram of a system environment 100 (or "environment 100") in which an efficiency metric matching system 114 can operate. As illustrated in FIG. 1, the environment 100 includes one or more server(s) 110 comprising a dynamic transportation matching system 112 that can communicate via a network 122 with a requestor device 116 and provider devices 102a-102n. The server(s) 110 can include one or more computing devices to implement the efficiency metric matching system 114. Additional description regarding the various computing devices (e.g., the server(s) 110, the provider devices 102a-102n, and/or the requestor device 116) is provided with respect to FIGS. 11-12 below.

As illustrated in FIG. 1, the server(s) 110 may generate, store, receive, and transmit various types of data including data relating to user devices, transportation requests, provider vehicles, transit vehicles, and other data. The efficiency metric matching system 114 may use the server(s) 110 to communicate with various computing devices. For example, the server(s) 110 receive data including indications of transportation requests from the requestor device 116. The server(s) 110 may also receive location information from and transmit transportation request information to the provider devices 102a-102n. The server(s) 110 can receive transit information from the dynamic transportation matching system 112. Additionally, the server(s) 110 can send data to the requestor device 116 including transportation options, transportation values, transit route information, and other relevant transit data. The server(s) 110 may comprise one or more server devices that implement the dynamic transportation matching system 112. The server(s) 110 may also comprise a communication server or a web-hosting server.

In one or more embodiments, the server(s) 110 can include or implement all or a portion of the dynamic transportation matching system 112. The dynamic transportation matching system 112 receives transportation requests including destination locations and starting locations from the requestor device 116. The dynamic transportation matching system 112 analyzes the transportation requests and identifies provider devices to fulfill the transportation request. For example, the dynamic transportation matching system 112 matches a transportation request corresponding with the requestor device 116 to the provider device 102a based on availability information and location information from the provider device 102a and the requestor device 116.

As further shown in FIG. 1, the server(s) 110 may include or implement all or a portion of the efficiency metric matching system 114. As indicated above, in some cases, the efficiency metric matching system 114 identifies a provider device to fulfill a transportation request within a future time window. For instance, the efficiency metric matching system 114 can analyze characteristics corresponding to a location associated with the transportation request to determine the future time window. Additionally, the efficiency metric matching system 114 can determine a threshold provider device efficiency metric based on the future time window, current provider devices (e.g., the provider devices 102a-102n), and a historical distribution of provider devices. The efficiency metric matching system 114 can further select a provider device of the provider devices 102a-102n to fulfill the transportation request by comparing predicted provider device efficiency metrics with the threshold provider device efficiency metric.

As further shown in FIG. 1, the environment 100 includes the requestor device 116 (e.g., associated with a requestor). The requestor device 116 collects, stores, and communicates data to the dynamic transportation matching system 112 or the efficiency metric matching system 114 and other computing devices within the environment 100. For example, the requestor device 116 sends transportation requests to the dynamic transportation matching system 112 or the efficiency metric matching system 114 and receives transportation options and corresponding information from either system. Additionally, the requestor device 116 sends, to the dynamic transportation matching system 112 an indication of a selection of transportation options.

As further indicated in FIG. 1, the requestor device 116 includes the requestor application 118. In some embodiments, the requestor application 118 comprise web browsers, applets, or other software applications (e.g., native applications) available to the requestor device 116. Additionally, in some instances, the dynamic transportation matching system 112 provides data including instructions that, when executed by the requestor device 116, create or otherwise integrate requestor applications within an application or webpage.

Additionally, the requestor device 116 can include computer-executable instructions that (upon execution) cause the requestor device 116 to communicate with the efficiency metric matching system 114 to present one or more graphical user interfaces for the requestor application 118. For example, in at least one embodiment, the requestor device 116 presents a transportation user interface comprising various elements including transportation options as well as data corresponding to each transportation option such as transportation values, estimated duration, estimated time of arrival, and other data.

As further shown in FIG. 1, the environment 100 includes the provider devices 102a-102n. Generally, the provider devices 102a-102n communicate with the dynamic transportation matching system 112 or the efficiency metric matching system 114. For example, the provider devices 102a-102n transmit, to the dynamic transportation matching system 112 or the efficiency metric matching system 114, location information, and the provider devices 102a-102n receive transportation request data required to fulfill a transportation request. For instance, a provider device of the provider devices 102a-102n receives information regarding the requestor 120, a desired destination location, the number of anticipated passengers, and other relevant information. The provider devices 102a-102n can be associated with a provider and/or be attached to (or integrated within) a provider vehicle.

In some embodiments, the dynamic transportation matching system 112 communicates with the provider devices 102-102n through the provider application 104. For instance, the dynamic transportation matching system 112 can transmit, via the provider application 104, route data to navigate to a pickup location to pick up the requestor 120, navigate to the destination location, and/or collect fares.

As illustrated in FIG. 1, the environment 100 includes a number of computing devices. As suggested above, each of the provider devices 102a-102n and the requestor device 116 may comprise a mobile device such as a laptop, smartphone, or tablet associated with a provider or the requestor 120, respectively. The provider devices 102a-102n and the requestor device 116 may comprise a variety of computing devices as further explained below with reference to FIG. 13.

In one or more embodiments, the provider devices 102a-102n (or requestor devices) correspond to one or more user accounts (e.g., user accounts stored at the server(s) 110). For example, a user of a provider device can establish a user account with login credentials and a provider of the provider device can establish a provider account with login credentials. These user accounts can include a variety of information regarding requestors/providers, including user information (e.g., name, telephone number, etc.), vehicle information (e.g., vehicle type, license plate number), device information (e.g., operating system, memory or processing capability), payment information, purchase history, transportation history, etc. Different accounts can also include various privileges associated with requestors and providers (e.g., privileges to access certain functionality via the transportation matching application, to provide transportation services, to submit transportation requests, etc.). The dynamic transportation matching system 112 can manage the provider devices 102a-102n (and requestor devices) based on appropriate privileges associated with the corresponding user accounts (e.g. provider accounts and/or requestor accounts). Accordingly, providers (and/or requestors) can utilize multiple devices (e.g., multiple provider devices or multiple requestor devices) with the appropriate privileges associated with the corresponding accounts.

The present disclosure utilizes provider devices (and requestor devices) to include devices associated with these user accounts. Thus, in referring to a provider device (or a requestor device), the disclosure and the claims are not limited to communications with a specific device, but any device corresponding to an account of a particular user. Accordingly, in using the term provider device, this disclosure includes any computing device corresponding to a provider account. Similarly, in using the term requestor device, this disclosure includes any computing device corresponding to a requestor account.

Although not illustrated in FIG. 1, in some embodiments, the environment 100 may have a different arrangement of components and/or may have a different number or set of components altogether. In certain implementations, for instance, one or more of the provider vehicles associated with the provider devices 102a-102n do not require a human operator but are instead autonomous transportation vehicles—that is, self-driving vehicles that include computer components and accompanying sensors for driving without manual-provider input from a human operator. As a further example, in some embodiments, the provider vehicle comprises a hybrid self-driving vehicle with both self-driving functionality and some human operator interaction.

When one or more provider vehicle associated with one of the provider devices 102a-102n comprises an autonomous vehicle or hybrid self-driving vehicle, the provider vehicle may include additional components not depicted in FIG. 1. Such components may include location components, one or more sensors by which the autonomous vehicle navigates, and/or other components necessary to navigate without a human operator (or with minimal interactions with a human operator).

Figure 2:
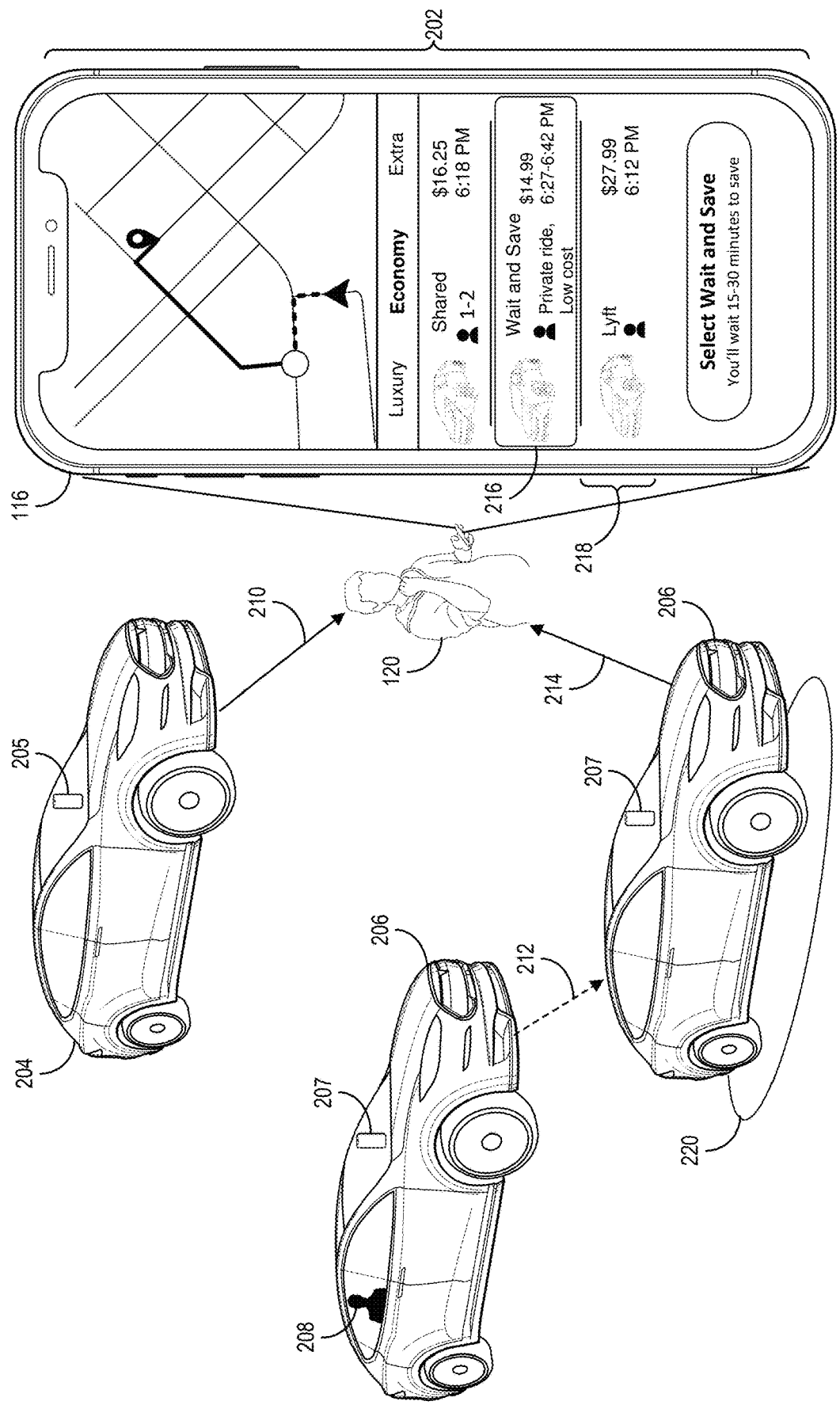
FIG. 2 illustrates a schematic diagram of determining at least two transportation options in accordance with one or more embodiments.

As mentioned previously, the efficiency metric matching system 114 can flexibly identify provider devices to fulfill a transportation request. In particular, the efficiency metric matching system 114 can determine and provide multiple transportation options, including transportation options with future time windows that allow the efficiency metric matching system 114 do identify more efficient transportation matches. FIG. 2 illustrates the efficiency metric matching system 114 determining and providing multiple transportation options in accordance with one or more embodiments. As illustrated in FIG. 2, the efficiency metric matching system 114 determines and provides a time window transportation option and a fixed time transportation option. Generally, by providing various transportation options, the efficiency metric matching system 114 can better tailor transportation matches to fit individual requestor criteria. For instance, the efficiency metric matching system 114 can provide a fixed time transportation option 218 comprising a drop-off time to prioritize quick pickup and drop-off times. Additionally, the efficiency metric matching system 114 provide a time window transportation option 216 that prioritizes value by offering more flexible pickup and drop-off times with a lower transportation value.

As mentioned, the efficiency metric matching system 114 provides various transportation options by which to transport a requestor to a destination. FIG. 2 illustrates a transportation user interface 202 presented on a screen of the requestor device 116 in accordance with one or more embodiments. The transportation user interface 202 includes the time window transportation option 216 and the fixed time transportation option 218. As illustrated in FIG. 2, the fixed time transportation option 218 comprises a fixed drop-off time (i.e., 6:12 PM). More specifically, the fixed drop-off time comprises an anticipated fixed time at which a provider device will arrive at the destination location to deliver the requestor device 116. In at least one other embodiment, the fixed transportation option 218 includes a fixed pickup time comprising an anticipated fixed time at which the provider device will arrive at the pickup location to pick up the requestor device 116. In contrast, to the fixed drop-off time of the fixed time transportation option 218, the time window transportation option 216 comprises a time window (i.e., 6:27-6:42 PM). As illustrated, the time window indicates a predicted drop-off time period during which the provider device will arrive at the destination location. As illustrated, the time window comprises a time period that is later than the drop-off time. Furthermore, in at least one embodiment, the time window transportation option 216 comprises a pickup time window indicating a time period in which the provider device will arrive at a pickup location.

As further illustrated in FIG. 2, the time window transportation options 216 and the fixed time transportation option 218 comprise transportation values. Generally, the efficiency metric matching system 114 determines transportation values associated with each of the transportation options. For example, the efficiency metric matching system 114 associates the fixed time transportation option 218 with the transportation value of $27.99 and the time window transportation option 216 with a lower transportation value of $14.99. In at least one embodiment, the transportation values displayed within the transportation user interface 202 comprise predicted transportation values.

The efficiency metric matching system 114 can select a provider device based on selection of the fixed time transportation option 218. In particular, the efficiency metric matching system 114 selects a provider device based on a variety of criteria. For instance, the efficiency metric matching system 114 may select a provider device based on identifying a provider device with the lowest time to the pickup location, closest proximity to the pickup location, lowest transportation value, highest driver rating, and/or other criteria. The efficiency metric matching system 114 may utilize a combination of criteria to determine an overall provider device selection score. For example, the efficiency metric matching system 114 may determine to select provider devices based on a combination of closest proximity to the pickup location as well as lowest transportation value.

As mentioned, in one or more embodiments, the efficiency metric matching system 114 selects the provider device based on identifying a provider device with the lowest estimated time to the pickup location. For example, as illustrated in FIG. 2, the efficiency metric matching system 114 selects a provider device 205 associated with a vehicle 204 to fulfill the transportation request based on selection of the fixed time transportation option 218. In at least one embodiment, the efficiency metric matching system 114 identifies available provider devices within a proximity range of the requestor device 116 or an indicated pickup location. Available provider devices comprise provider devices not currently involved in fulfilling a transportation request. The efficiency metric matching system 114 compares estimated times to the pickup location between the available provider devices and selects a provider device with the lowest estimated time to the pickup location to fulfill the transportation request. For instance, the efficiency metric matching system 114 selects the provider device 205 to fulfill the transportation request based on determining that an estimated time to the pickup location 210 is the shortest estimated time to the pickup location or satisfies a time to pickup location threshold.

As further illustrated in FIG. 2, based on selection of the time window transportation option 216, the efficiency metric matching system 114 can select a provider device based on a provider device efficiency metric. Generally, because of the added flexibility associated with a time window, the efficiency metric matching system 114 can select a provider device from a wider range of potential provider devices. For instance, because the efficiency metric matching system 114 can delay selection of a provider device, the potential provider devices can comprise currently available provider devices as well as provider devices currently fulfilling other transportation requests or offline provider devices that will become available within the future time window. Furthermore, the efficiency metric matching system 114 may select the provider device by focusing on criteria other than the estimated time to the pickup location. The efficiency metric matching system 114 may select the provider device based on a provider device efficiency metric and dynamic threshold provider device efficiency metric. FIG. 2 illustrates an example provider device efficiency metric in accordance with one or more embodiments.

In at least one embodiment, the provider device efficiency metric comprises a time that a potential provider device can be without a passenger prior to fulfilling the transportation request. As illustrated in FIG. 2, a provider device 207 associated with a vehicle 206 could be unavailable at the time the requestor 120 selects the time window transportation option 216. For example, the provider device 207 is fulfilling a transportation request by transporting a passenger 208 to a passenger destination location 220 at the time the requestor 120 selects the time window transportation option 216. For the provider device 207, the estimated time to the pickup location comprises a time to passenger drop-off 212 as well as a time without a passenger 214. In contrast, and as illustrated in FIG. 2, the provider device efficiency metric for the provider device 207 comprises the time without a passenger 214 from the passenger destination location 220 to the pickup location. By selecting a provider device based on a provider device efficiency metric instead of estimated time to the pickup location, the efficiency metric matching system 114 can minimize the amount of time that a provider vehicle is without a passenger and thus increase the utilization of provider devices.

Although FIG. 2 illustrates the efficiency metric matching system 114 determining the transportation option based on user input, the efficiency metric matching system 114 may also automatically select a transportation option. In particular, the efficiency metric matching system 114 may automatically begin selecting provider devices based on provider device efficiency metrics. For example, based on determining a threshold imbalance of requestor devices to provider devices, the efficiency metric matching system 114 can automatically shift a proportion of transportation requests to prioritize provider device efficiency metrics.

Figure 3:
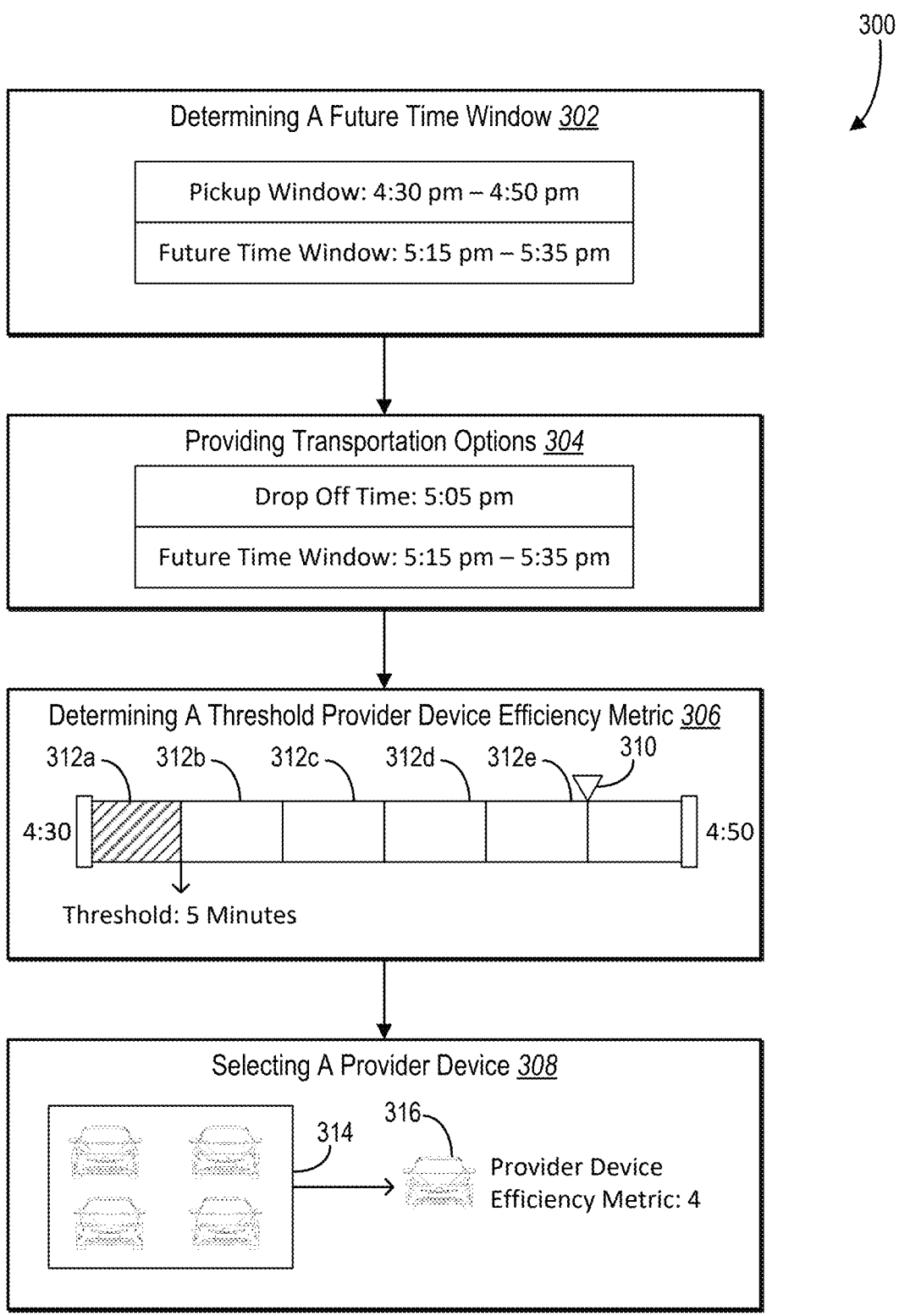
FIG. 3 illustrates an overview for selecting a provider device based on a threshold provider device efficiency metric in accordance with one or more embodiments of the present disclosure.

As mentioned, based on selection of the time window transportation option 216, the efficiency metric matching system 114 can select a provider device from potential provider devices that can fulfill the transportation request within the future time window. FIG. 3 and the corresponding discussion provide a general overview of the efficiency metric matching system 114 selecting the provider device within a pickup window in accordance with one or more embodiments. In particular, FIG. 3 illustrates a series of acts 300 performed by the efficiency metric matching system 114 for selecting a provider device to fulfill a transportation request within a future time window. Generally, the series of acts 300 includes an act 302 of determining a future time window, an act 304 of providing transportation options, an act 306 of determining a threshold provider device efficiency metric, and an act 308 of selecting a provider device.

As illustrated in FIG. 3, the series of acts 300 includes the act 302 of determining a future time window. In at least one embodiment, the efficiency metric matching system 114 performs the act 302 based on receiving an indication of a digital transportation request. Generally, the indication of the digital transportation request comprises a signal that a requestor may submit a transportation request. For example, the indication of the digital transportation request may comprise receiving an indication that a requestor device has accessed an application, received the entry of a destination location, or received a request to initiate a transportation request (e.g., confirm selection of a transportation option).

As further illustrated in FIG. 3, the act 302 comprises determining a future time window to fulfill the digital transportation request. The future time window indicates an expected time period during which a provider device will deliver the requestor device to the destination location. The efficiency metric matching system 114 determines the beginning time and length of a future time window in which a provider device may realistically deliver the requestor device to the destination location. As illustrated in FIG. 3, the efficiency metric matching system 114 determines that the future time window begins at 5:15 pm and runs until 5:35 pm.

Figure 4:
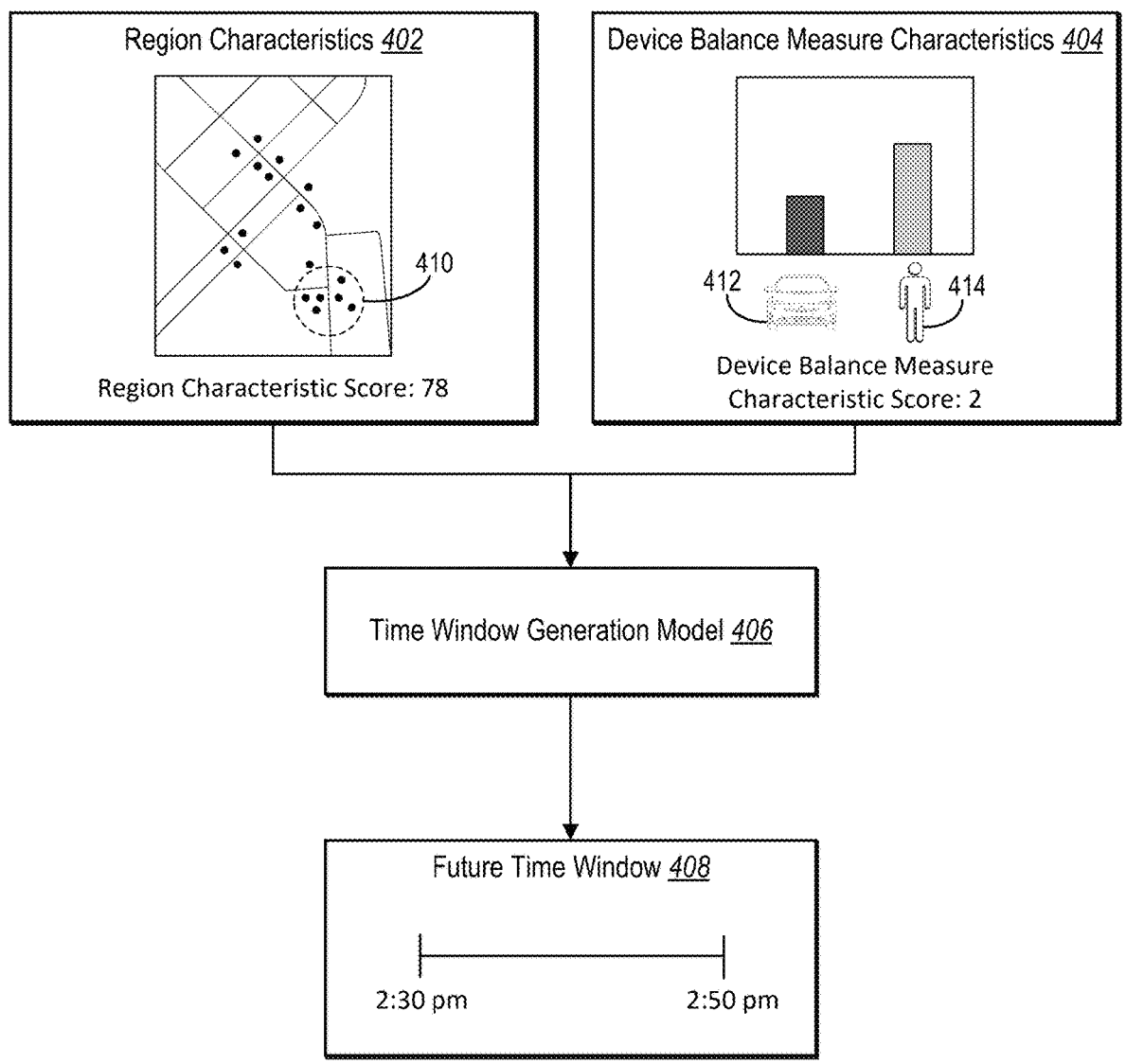
FIG. 4 illustrates determining a future time window in accordance with one or more embodiments of the present disclosure.

As part of performing the act 302 of determining a future time window, the efficiency metric matching system 114 can also determine a pickup window. The pickup window comprises a period of time in which a selected provider device will arrive at a pickup location. Furthermore, in some embodiments, the efficiency metric matching system 114 also selects and dispatches a provider device within the pickup window. Generally, the efficiency metric matching system 114 analyzes characteristics corresponding to a location associated with the transportation request to determine the pickup window. For instance, the efficiency metric matching system 114 analyzes region characteristics indicating a density of points within a region and device balance measure characteristics indicating current requestor devices and current provider devices corresponding to the location. As illustrated in FIG. 3, the pickup window comprises a time period from 4:30 pm-4:50 pm. FIG. 4 and the corresponding discussion provide additional detail regarding determining a future time window in accordance with at least one embodiment.

Figure 8B:
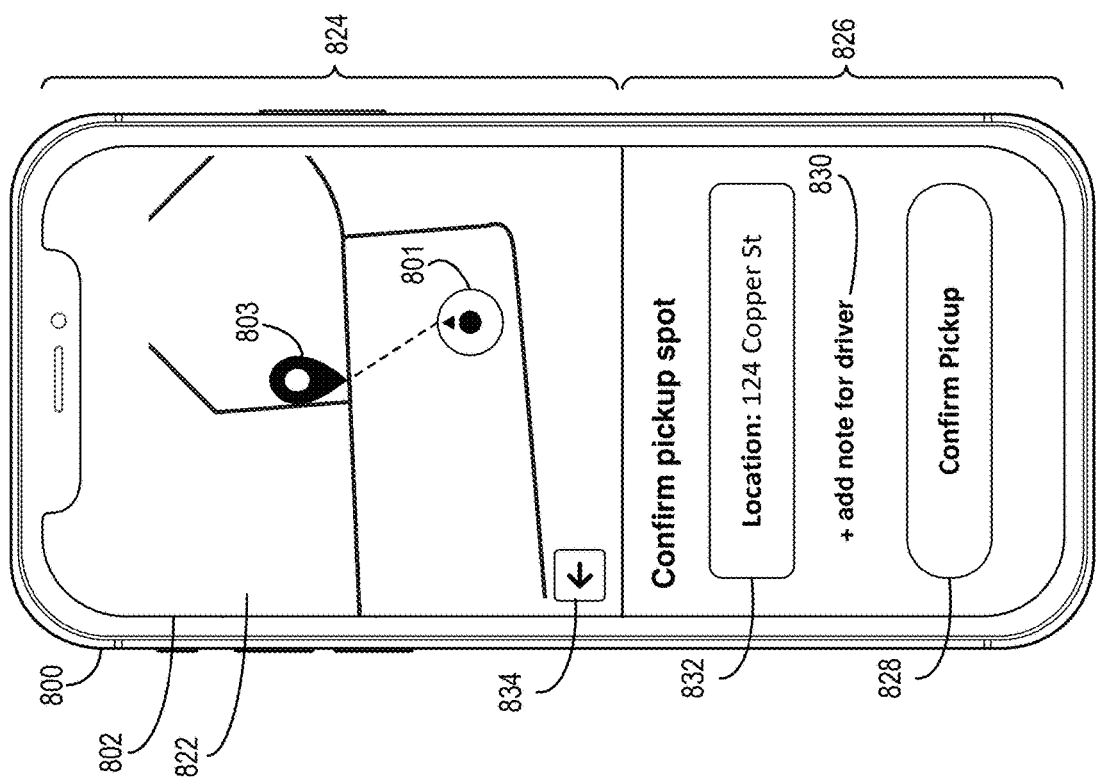
FIGS. 8A-8C illustrate a series of graphical user interfaces including a transportation user interface presenting multiple transportation options in accordance with one or more embodiments of the present disclosure.
Figure 8A:
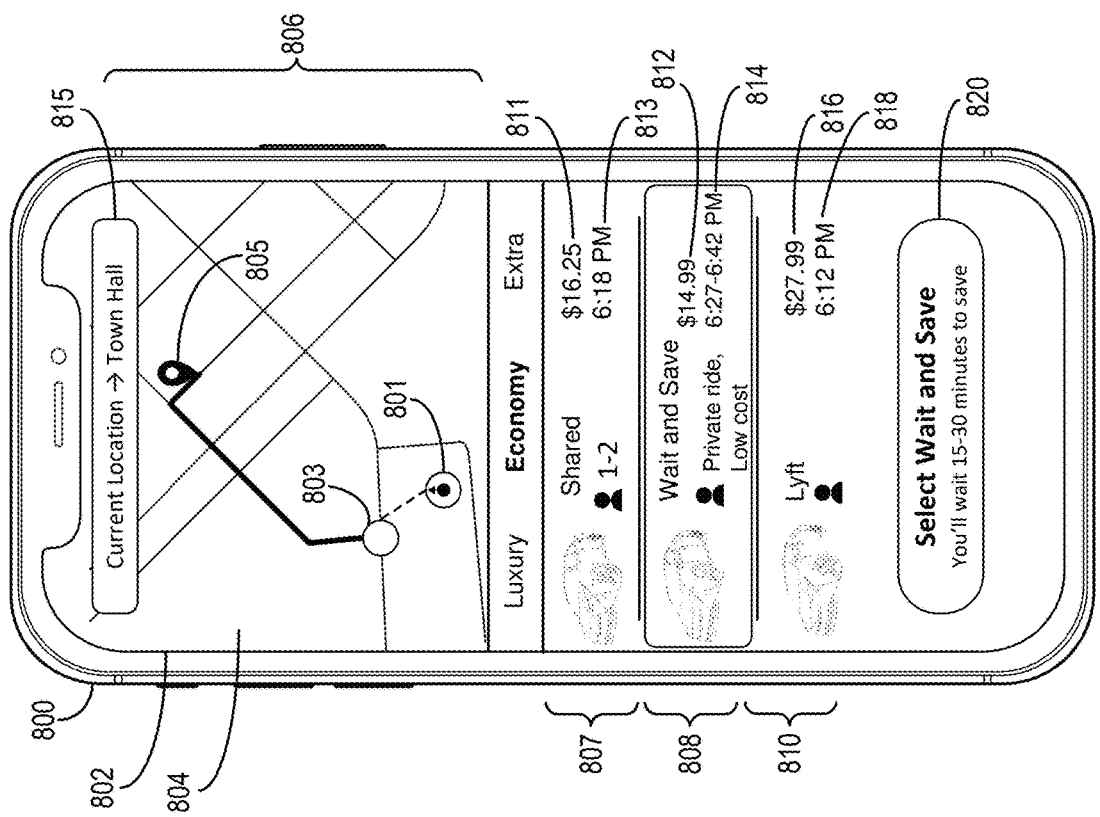
Figure 8C:
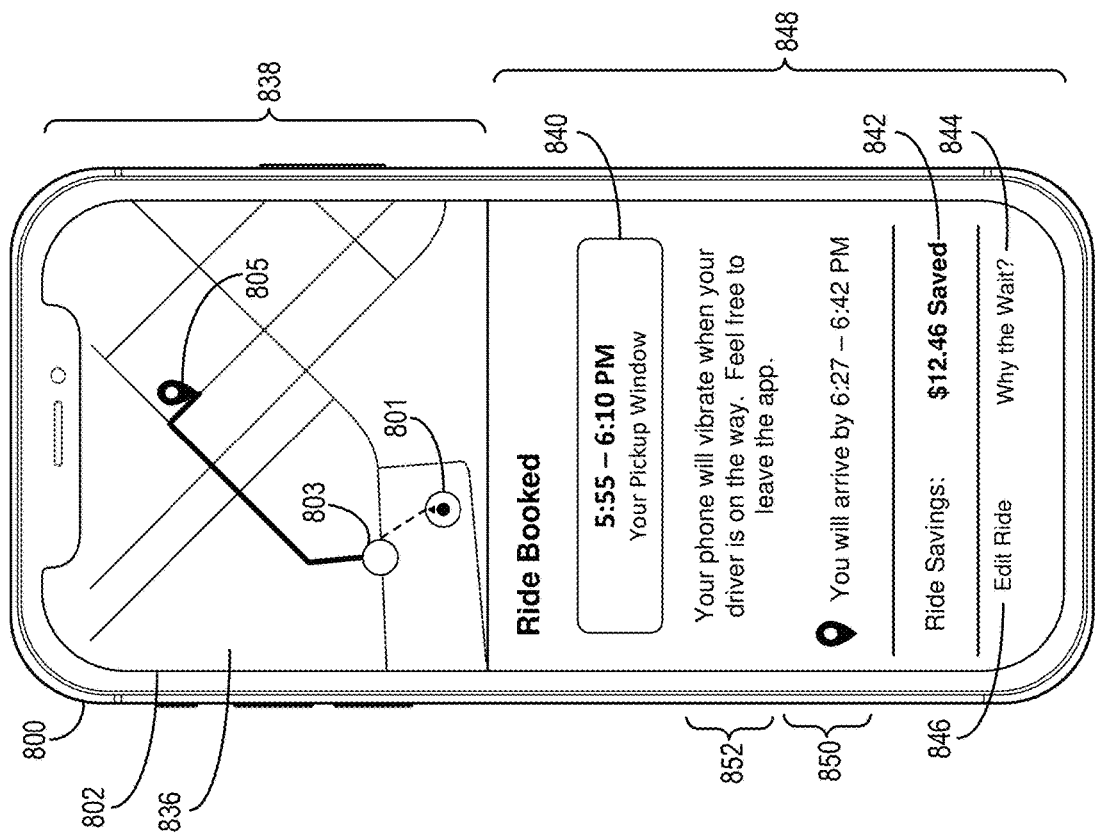

As further illustrated in FIG. 3, as part of the series of acts 300, the efficiency metric matching system 114 performs the act 304 of providing transportation options. In particular, the efficiency metric matching system 114 provides, for display within a transportation user interface of the requestor device, various transportation options. As illustrated in FIG. 3, the efficiency metric matching system 114 provides a first transportation option comprising the arrival time (e.g., 5:05 pm) together with a second transportation option comprising the future time window determined in the act 302 (e.g., 5:15 pm-5:35 pm). Although not illustrated, the two transportation options can also include different transportation values or other varying characteristics. FIGS. 8A-8C illustrate example transportation user interfaces in accordance with one or more embodiments.

Figure 5:
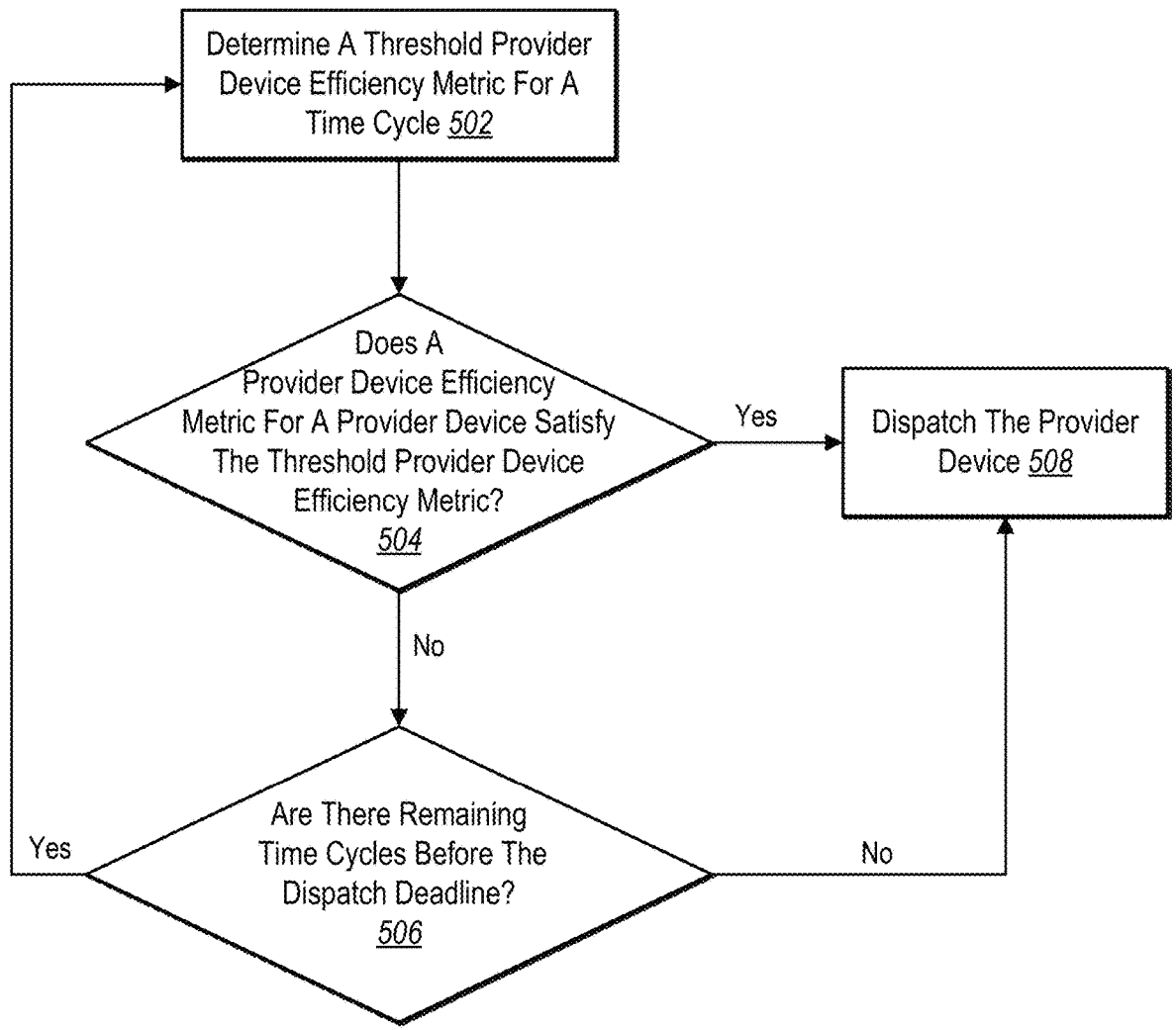
FIG. 5 illustrates a process flow diagram of the efficiency metric matching system selecting a provider device based on the threshold provider device efficiency metric in accordance with one or more embodiments of the present disclosure.
Figure 6:
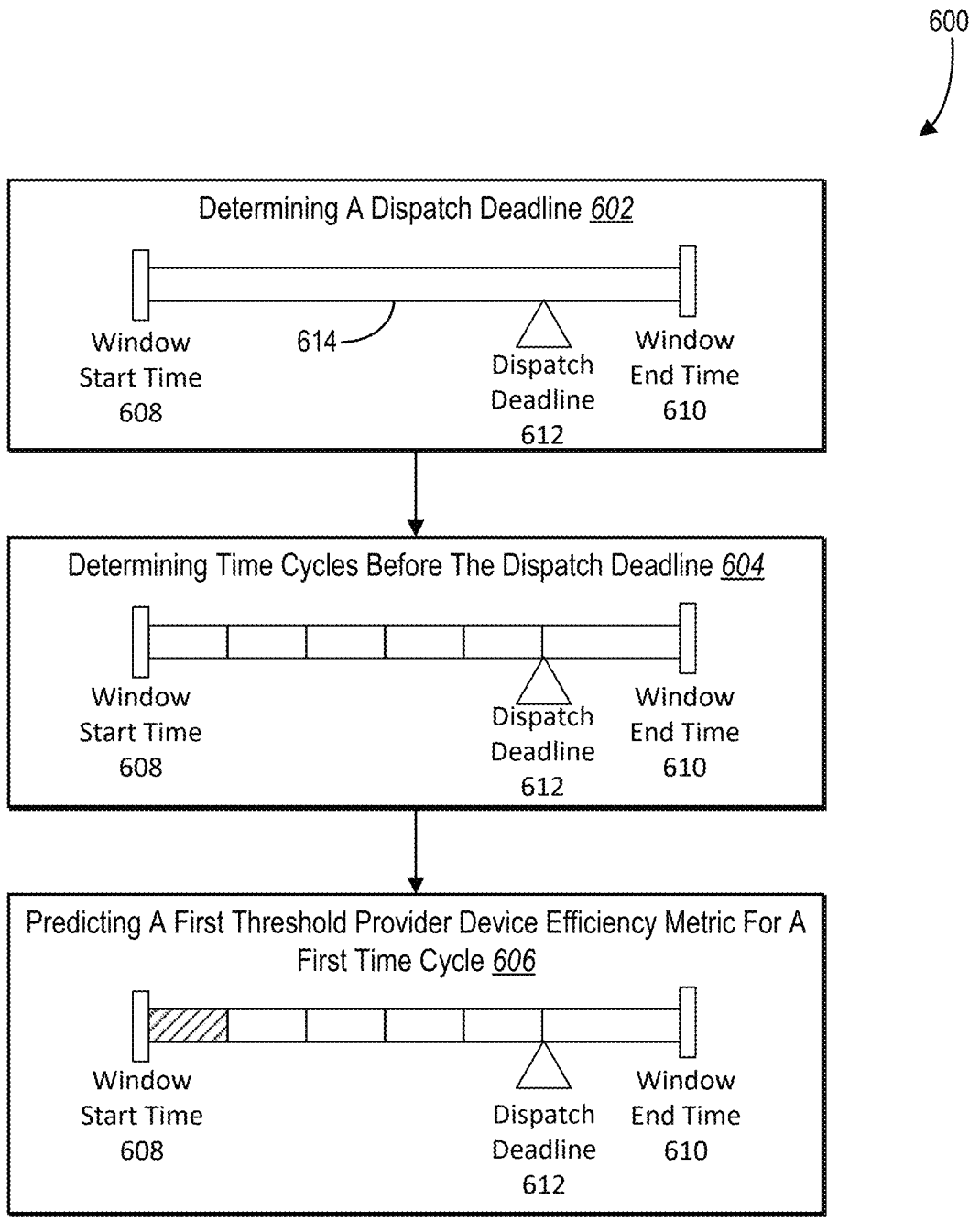
FIG. 6 illustrates an overview for predicting a first threshold provider device efficiency metric for a first time cycle in accordance with one or more embodiments of the present disclosure.
Figure 7:
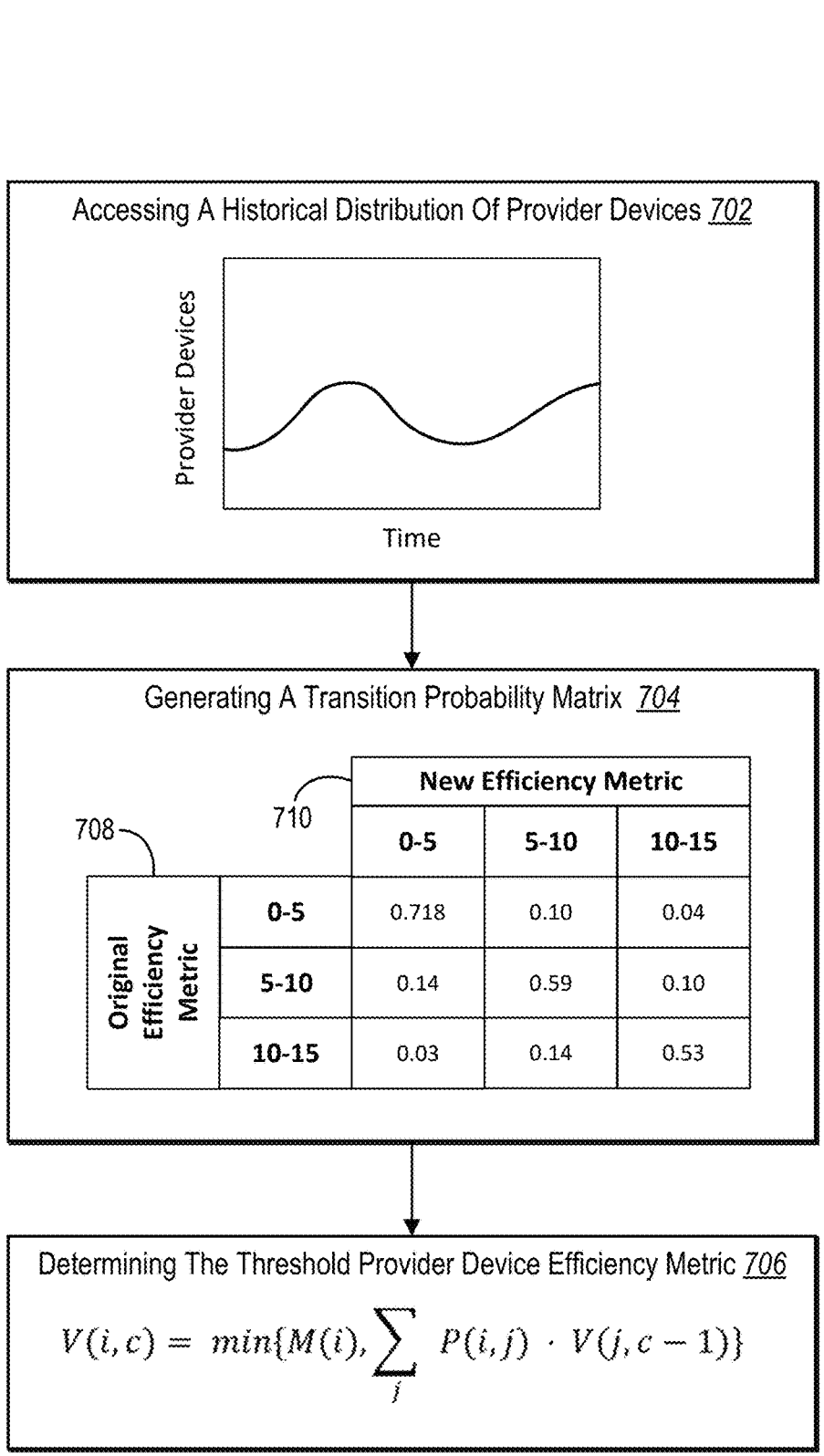
FIG. 7 illustrates determining a threshold provider device efficiency metric based on a transition probability matrix in accordance with one or more embodiments of the present disclosure.

The series of acts 300 includes the act 306 of determining a threshold provider device efficiency metric. As previously mentioned, the efficiency metric matching system 114 can select a provider device from potential provider devices that will become available within the pickup window. Generally, the efficiency metric matching system 114 determines, at the time cycles 312a-312e within the pickup window, whether to dispatch a current provider device or to wait until a future time cycle to dispatch a provider device. The efficiency metric matching system 114 makes this determination based on threshold provider device efficiency metrics for each of the time cycles 312a-312e. In at least one embodiment, the efficiency metric matching system 114 predicts threshold provider device efficiency metrics based on the number of remaining time cycles before a dispatch deadline 310, the current provider devices, and a historical distribution of provider devices. The threshold provider device for any given time cycle can reflect an expected provider device efficiency metric given current provider devices and the remaining time cycles. For example, as illustrated in FIG. 3, the efficiency metric matching system 114 determines that the threshold provider device efficiency metric for the time cycle 312a is 5 minutes. FIGS. 5-7 illustrate the efficiency metric matching system 114 determining the threshold provider device efficiency metric in accordance with one or more embodiments.

As illustrated in FIG. 3, the efficiency metric matching system 114 performs the act 308 of selecting a provider device. Generally, the efficiency metric matching system 114 selects the provider device based on the threshold provider device efficiency metric. For example, as illustrated in FIG. 3, the efficiency metric matching system 114 predicts provider device efficiency metrics for current provider devices 314 within a particular time cycle. The efficiency metric matching system 114 selects a provider device 316 of the current provider devices 314 based on determining that the provider device efficiency metric for the provider device 316 satisfies the threshold provider device efficiency metric. For instance, as illustrated in FIG. 3, the efficiency metric matching system 114 selects the provider device 316 based on determining that the provider device efficiency metric equals 4 minutes, which satisfies (i.e., is less than) the threshold provider device efficiency metric of 5 minutes.

While FIG. 3 provides a broad overview of the efficiency metric matching system 114 selecting a provider device by utilizing threshold provider device efficiency metrics in accordance with at one or more embodiments, the subsequent figures illustrate additional detail regarding individual acts described with respect to FIG. 3. In particular, FIG. 4 illustrates the efficiency metric matching system 114 determining the future time window in accordance with one or more embodiments. As mentioned previously, the efficiency metric matching system 114 can determine a future time window in which a selected provider device can fulfill a transportation request. More specifically, in at least one embodiment, the efficiency metric matching system 114 determines the future time window by analyzing characteristics corresponding to a location associated with transportation request. For instance, and as illustrated in FIG. 4, characteristics corresponding to the location comprise region characteristics 402 and device balance measure characteristics 404. The efficiency metric matching system 114 inputs the region characteristics 402 and the device balance measure characteristics 404 into a time window generation model 406 to predict a future time window.

As mentioned, the efficiency metric matching system 114 determines a future time window to fulfill a transportation request by analyzing characteristics corresponding to a location associated with the transportation request. The efficiency metric matching system 114 identifies the location by analyzing the transportation request and determining an area associated with the transportation request. In at least one embodiment, the location associated with the transportation request comprises an area encompassing a pickup location. For instance, the location associated with the transportation request may comprise a neighborhood or city of a pickup location. In other embodiments, the location associated with the transportation request may comprise other geographic areas associated with the transportation request such as the request location, the destination location, or other locations.

As illustrated in FIG. 4, the efficiency metric matching system 114 determines the region characteristics 402 corresponding to the location. Generally, the region characteristics 402 indicate whether a region associated with the location is dense or sparse. In particular, the region characteristics 402 indicate a density of points within a region. For example, as illustrated in FIG. 4, the efficiency metric matching system 114 determines the region characteristics 402 corresponding to a region 410 associated with the location. Points within the region 410 may comprise buildings (e.g., residential, retail, office, venue, etc.). In at least one embodiment, the efficiency metric matching system 114 determines points within a region based on historical transportation requests. For instance, the efficiency metric matching system 114 may identify historical pickup and destination locations as points within the region 410. The efficiency metric matching system 114 may associate longer future time windows and/or later start times for future time windows. For instance, in less dense regions, the efficiency metric matching system 114 may predict that potential provider devices must travel greater distances to arrive at the pickup location.

In at least one embodiment, as part of determining the region characteristic 402, the efficiency metric matching system 114 generates a region characteristic score. In particular the region characteristic score reflects the density of points within the region. For example, in one embodiment, the efficiency metric matching system 114 may calculate the floor area ratio by dividing total floor area of buildings by land area. In another embodiment, the efficiency metric matching system 114 designates the number of pickup and drop-off points within the region 410 as the region characteristic score. The efficiency metric matching system 114 may associate a higher region characteristic score to indicate regions with a greater density.

As further illustrated in FIG. 4, the efficiency metric matching system 114 determines the device balance measure characteristics 404. Generally, the device balance measure characteristics indicate the balance between current requestor devices and current provider devices corresponding to the location. As illustrated, the efficiency metric matching system 114 determines a ratio of requestors 414 to provider devices 412 (current and/or historical). For instance, the efficiency metric matching system 114 determines that the device balance measure characteristic score equals 2, meaning that for every current provider device, there are two requestor devices. In at least one embodiment, the efficiency metric matching system 114 associates a longer or later future time window with greater ratios of requestor devices to provider devices. For instance, the efficiency metric matching system 114 may take a longer time to identify and select a provider device when provider devices are high in demand.

In at least one embodiment, the efficiency metric matching system 114 shifts the start time of the future time window and the pickup window based on imbalances within the device balance measure characteristics 404. The efficiency metric matching system 114 can determine to delay the window start time by predetermined time increments based on a threshold shift in the device balance measure characteristics 404. For example, based on a 75% shift in balance from the ratio of requestor devices to provider devices, the efficiency metric matching system 114 can determine to delay the pickup window start time by 15 minutes.

Although FIG. 4 illustrates the efficiency metric matching system 114 determining the region characteristics 402 and the device balance measure characteristics 404, the efficiency metric matching system 114 may determine additional characteristics as part of generating the future time window 408. For example, in at least one embodiment, the efficiency metric matching system 114 determines a future time window balance characteristic. The future time window balance characteristic indicates a ratio of requestor devices that have selected a future time window transportation option to requestor devices that have selected a fixed time transportation option. Generally, the efficiency metric matching system 114 can associate longer and/or later future time windows when the efficiency metric matching system 114 determines that a greater proportion of requestor devices have selected the fixed time transportation option.

As further illustrated in FIG. 4, the efficiency metric matching system 114 utilizes the time window generation model 406 to generate the future time window 408. Generally, the efficiency metric matching system 114 utilizes the time window generation model 406 to analyze characteristics corresponding to the location to determine the future time window 408. The time window generation model 406 comprises an algorithm or a model. For example, the time window generation model 406 may comprise an algorithm that predicts a window start time (i.e., time from the time of request) and a window end time based on the region characteristic score and the device balance measure characteristic score.

Furthermore, in at least one embodiment, the efficiency metric matching system 114 utilizes the time window generation model 406 to generate the pickup window. The efficiency metric matching system 114 may then determine the future time window based on the pickup window. For instance, the efficiency metric matching system 114 can predict the future time window by adding a predicted time from the pickup location to the destination location to the start and end times of the pickup window to generate the future time window.

In some embodiments, the time window generation model 406 comprises a time window generation machine learning model. In particular, the efficiency metric matching system 114 trains the time window generation machine learning model utilizing training data comprising training characteristics and training provider device pickup times. In particular, the time window generation machine learning model generates predicted window start times and predicted window end times based on training characteristics. The efficiency metric matching system 114 compares the predicted window start times and predicted window end times with training provider device pickup times. The efficiency metric matching system 114 performs a loss function to modify parameters of the time window generation machine learning model.

Additionally, or alternatively, the efficiency metric matching system 114 can utilize a heuristic model to generate the future time window. In particular, the heuristic model may analyze characteristics corresponding to the location to determine window start and window end times. The heuristic model may utilize a heuristic algorithm that associates various weights with different characteristics. For instance, the efficiency metric matching system 114 may utilize the heuristic model to analyze the region characteristics and/or the device balance measure characteristics to determine the window start time and the window end time for the future time window.

As mentioned previously, the efficiency metric matching system 114 can provide the future time window 408 together with a corresponding time window transportation value for display via a transportation user interface. Additionally, the efficiency metric matching system 114 also provides a fixed time transportation option comprising an arrival time and a fixed time transportation value via the transportation user interface. The efficiency metric matching system 114 may utilize various methods to determine the time window transportation value and the fixed time transportation value. For instance, in one or more embodiments, the efficiency metric matching system 114 may dynamically determine the fixed time transportation value based on various factors including the route, time of day, number of available provider devices, current demand for rides, local fees or surcharges, provider vehicle type, and other factors. In one embodiment, the efficiency metric matching system 114 utilizes a heuristic model to determine the fixed time transportation value.

The efficiency metric matching system 114 may determine the time window transportation value based on the fixed time transportation value and a delay or difference between the arrival time and the future time window. In particular, the efficiency metric matching system 114 can analyze historical data comprising delayed times and transportation values to predict time window transportation values. For example, in one embodiment, the efficiency metric matching system 114 may associate delay thresholds with set reductions in transportation values based on historical data. For instance, based on determining that the difference between the arrival time and the future time window is within a first delay threshold (e.g., less than 10 minutes), the efficiency metric matching system 114 determines the time window transportation window by subtracting a fixed proportion (e.g., 3%) from the fixed time transportation value. Based on determining that the difference between the arrival time and the future time window is within a second delay threshold (e.g., between 10 and 15 minutes), the efficiency metric matching system 114 can subtract a second and greater fixed proportion (e.g., 5%) from the fixed time transportation value to determine the time window transportation value.

FIG. 4 illustrates generating a future time window 408 and/or a pickup window. As illustrated, the efficiency metric matching system provides the future time window (and/or the pickup window) for display at a requestor device. Based on detecting selection of the time window transportation option, the efficiency metric matching system 114 determines a threshold provider device efficiency metric to select a provider device to fulfill the transportation request within the future time window. FIGS. 5-7 illustrate the efficiency metric matching system 114 determining the threshold provider device efficiency metric and selecting the provider device in accordance with one or more embodiments. In particular, FIG. 5 illustrates an example overview of the efficiency metric matching system 114 selecting a provider device based on the threshold provider device efficiency metric. FIG. 6 illustrates a general overview of the efficiency metric matching system 114 predicting a first threshold provider device efficiency metric for a first time in accordance with one or more embodiments. FIG. 7 provides additional detail regarding the efficiency metric matching system 114 determining a threshold provider device efficiency metric in accordance with at least one embodiment.

As discussed, FIG. 5 illustrates a process flow diagram providing an overview of the efficiency metric matching system 114 selecting a provider device based on the threshold provider device efficiency metric in accordance with one or more embodiments. As will be discussed in greater detail below with respect to FIG. 6, the efficiency metric matching system 114 determines a dispatch deadline within the pickup window and determines time cycles before the dispatch deadline. The efficiency metric matching system 114 evaluates current provider devices within each time cycle to determine whether or not to select and dispatch a particular provider device.

As illustrated in FIG. 5, at step 502, the efficiency metric matching system 114 performs an act of determining a threshold provider device efficiency metric for a time cycle. In particular, the efficiency metric matching system 114 determines the threshold provider device efficiency metric based on the pickup window, current provider devices, and a historical distribution of provider devices. The threshold provider device efficiency metric generally indicates an expected provider device efficiency metric for a given time cycle. For example, in at least one embodiment, the threshold provider device efficiency metric comprises a threshold time that a potential provider device can be without a passenger prior to fulfilling the transportation request. FIG. 7 and the corresponding discussion provider additional detail relating to determining a threshold provider device efficiency metric for a time cycle.

Based on determining the threshold provider device efficiency metric, the efficiency metric matching system 114 proceeds to step 504 and determines whether a provider device efficiency metric for a provider device satisfies the threshold provider device efficiency metric. In particular, the efficiency metric matching system 114 predicts provider device efficiency metrics for current provider devices and compares the provider device efficiency metrics with the threshold provider device efficiency metric. As mentioned previously, current provider devices do not only comprise currently available provider devices (i.e., provider devices not currently involved in fulfilling a transportation request) but also provider devices involved in fulfilling transportation requests. For instance, in at least one embodiment, the efficiency metric matching system 114 predicts the time that current provider devices would be without a passenger prior to fulfilling the transportation request. Thus, for example, the efficiency metric matching system 114 predicts provider device efficiency metrics for provider devices that are currently transporting other requestor devices to destination locations by determining the amount of time required for the provider devices to reach the pickup location after dropping off their current passengers.

The efficiency metric matching system 114 predicts the provider device efficiency metrics by determining routes for the current provider devices to travel to the pickup location and estimating travel times for the determined routes. As previously mentioned, in at least one embodiment, the provider device efficiency metric comprises an estimated time that a current provider device will be without a passenger prior to fulfilling a transportation request. For example, for a currently available provider device, the efficiency metric matching system 114 determines a route from the current location of the available provider device to the pickup location. The efficiency metric matching system 114 designates the travel time to complete the route as the provider device efficiency metric for the currently available provider device. For a current provider device that is currently involved in fulfilling a transportation request, the efficiency metric matching system 114 predicts a travel time to complete a route from the current destination location to the pickup location.

The efficiency metric matching system 114 predicts provider device efficiency metrics for all current provider devices associated with the location corresponding to the transportation request. For instance, in one embodiment, the efficiency metric matching system 114 predicts provider device efficiency metrics for current provider devices in a geographic area surrounding the location (e.g., city, town, etc.). In at least one embodiment, instead of predicting provider device efficiency metrics for all current provider devices within a geographic area, the efficiency metric matching system 114 predicts provider device efficiency metrics for current provider devices within a threshold distance of the pickup location. Furthermore, in yet other embodiments, the efficiency metric matching system 114 identifies current provider devices that are fulfilling transportation requests with destination locations within the threshold distance of the pickup location.

As illustrated by step 508 in FIG. 5, based on determining that a provider device efficiency metric for a provider device satisfies the threshold provider device efficiency metric, the efficiency metric matching system 114 dispatches the provider device. For example, based on determining that the time in which a particular provider device is without a passenger before picking up the requestor device is lower than the threshold provider device efficiency metric, then the efficiency metric matching system 114 dispatches the particular provider device.

However, as illustrated by step 506, if the efficiency metric matching system 114 determines that a provider device efficiency metric for a provider device does not satisfy the threshold provider device efficiency metric, the efficiency metric matching system 114 determines whether remaining time cycles exist before the dispatch deadline. Generally, the dispatch deadline comprises the last moment within the future time window at which the efficiency metric matching system 114 must dispatch a provider device for the provider device to arrive at the pickup location within the future time window. For example, and as illustrated in FIG. 5, based on determining that no time cycles remain before the dispatch deadline or that the time has reached the dispatch deadline, the efficiency metric matching system 114 proceeds to the step 508 and dispatches a provider device. For instance, the efficiency metric matching system 114 can identify and dispatch a provider device with the shortest estimated time of arrival.

As further illustrated in FIG. 5, based on determining in the step 506 that remaining time cycles exist before the dispatch deadline, the efficiency metric matching system 114 proceeds to the step 502. More specifically, the efficiency metric matching system 114 determines a threshold provider device efficiency metric for the next time cycle. The efficiency metric matching system 114 may thus repeat the process of determining threshold provider device efficiency metrics and predicting provider device efficiency metrics for current provider devices for each time cycle within the pickup window until the efficiency metric matching system 114 selects a provider device.

As mentioned, the efficiency metric matching system 114 predicts a threshold provider device efficiency metric for a first time cycle within a pickup window. FIG. 6 provides additional detail regarding the efficiency metric matching system 114 determining time cycles within a pickup window. In particular, FIG. 6 illustrates a series of acts 600 comprising an act 602 of determining a dispatch deadline, act 604 of determining time cycles before the dispatch deadline, and an act 606 of predicting a first threshold provider device efficiency metric for a first time cycle.

As illustrated in FIG. 6, the efficiency metric matching system 114 performs the act 602 of determining a dispatch deadline. For instance, as illustrated, the efficiency metric matching system 114 determines a pickup window 614 comprising a window start time 608 and a window end time 610. The efficiency metric matching system 114 determines a dispatch deadline 612 within the pickup window 614. As mentioned previously, the dispatch deadline 612 comprises the last moment at which the efficiency metric matching system 114 must dispatch a provider device for the provider device to arrive at the pickup location at or before the window end time 610. Thus, the efficiency metric matching system 114 selects a provider device based on the threshold provider device efficiency metric from the window start time 608 to the dispatch deadline 612. If the efficiency metric matching system 114 determines that the time has reached the dispatch deadline 612 and the efficiency metric matching system 114 has still not selected a provider device, then the efficiency metric matching system 114 automatically dispatches a provider device. For instance, the efficiency metric matching system 114 can dispatch, at the dispatch deadline 612, a provider device with the shortest estimated time to the pickup location. In some cases, this means that the efficiency metric matching system 114 dispatches a provider device that is nearest to the pickup location.

The efficiency metric matching system 114 determines the dispatch deadline based on current and historical provider device data. For instance, in at least one embodiment, the efficiency metric matching system 114 analyzes past provider device data, including location and supply data, for a location to predict the time required for a provider device to travel to the pickup location by the window end time 610. Furthermore, the efficiency metric matching system 114 can analyze current provider device data to determine the location and supply of current provider devices. By estimating locations of potential provider devices and predicting the estimated time for the potential provider devices to arrive at the pickup location, the efficiency metric matching system 114 can determine the time of the dispatch deadline 612.

As further illustrated in FIG. 6, the efficiency metric matching system 114 performs the act 604 of determining time cycles before the dispatch deadline. Generally, the efficiency metric matching system 114 divides time between the window start time 608 and the dispatch deadline 612 into time cycles. In particular, the efficiency metric matching system 114 may predetermine the duration of each time cycle. For instance, a time cycle can comprise one second, several seconds, one minute, five minutes, etc. The efficiency metric matching system 114 may predetermine the duration of each time cycle by utilizing various methods. For instance, in at least one embodiment, the efficiency metric matching system 114 determines the duration of the time cycles based on the length of the pickup window 614. For example, the efficiency metric matching system 114 can associate shorter time cycles with shorter pickup windows. In at least one embodiment, the efficiency metric matching system 114 associates a fixed number of time cycles per pickup window. For instance, the efficiency metric matching system 114 may determine that each pickup window will include x number of time cycles (e.g., 10, 15, 20, etc.) and evenly divides the time from the window start time 608 to the dispatch deadline 612 into the x number of time cycles. In particular, the efficiency metric matching system 114 may determine the x number of time cycles based on computational strain. For instance, the efficiency metric matching system 114 may decrease the number of time cycles within any given pickup window based on an increased number of selected time window transportation options.

As illustrated in FIG. 6, the series of acts 600 includes the act 606 of predicting a first threshold provider device efficiency metric for a first time cycle. Generally, the efficiency metric matching system 114 determines different threshold provider device efficiency metrics for each time cycle. For example, at the beginning of the pickup window 614, the efficiency metric matching system 114 might generate a threshold provider device efficiency metric corresponding to higher criteria—for instance, a shorter time that a potential provider device can be without a passenger. In particular, the efficiency metric matching system 114 determines, at the beginning of the pickup window 614, a high probability that the efficiency metric matching system 114 will select a provider device with a provider device efficiency metric that satisfies higher criteria within either the current time cycle or the subsequent time cycles. The efficiency metric matching system 114 progressively lowers the criteria of the threshold provider device efficiency metric (e.g., increasing the time that a potential provider device can be without a passenger) to increase the probability of selecting a provider device before the dispatch deadline.

FIG. 6 illustrates an overview of the efficiency metric matching system 114 determining time cycles within a pickup window and associating predicting threshold provider device efficiency metrics with time cycles in accordance with one or more embodiments. FIG. 7 and the corresponding discussion provide additional specifics of how the efficiency metric matching system 114 determines a threshold provider device efficiency metric in accordance with one or more embodiments. In particular, in at least one embodiment, the efficiency metric matching system 114 determines the threshold provider device efficiency metric based on the future time window, current provider devices, and a historical distribution of provider devices. FIG. 7 illustrates a series of acts 700 comprising an act 702 of accessing a historical distribution of provider devices, an act 704 of generating a transition probability matrix, and an act 706 of determining the threshold provider device efficiency metric. Based on the comparing the current provider devices with the historical distribution of provider devices, the efficiency metric matching system 114 can predict provider devices that will become available within a potential pickup window.

As illustrated in FIG. 7, the efficiency metric matching system 114 performs the act 702 of accessing a historical distribution of provider devices. Generally, the efficiency metric matching system 114 utilizes the historical distribution of provider devices to evaluate the probability of provider devices becoming available within the future time window given the currently available provider devices. For example, as illustrated in FIG. 7, the historical distribution of provider devices is represented by a graph displaying the number of available provider devices over time. Furthermore, in addition to capturing the number of available provider devices, the historical distribution of provider devices can include additional data with respect to provider devices and transportation requests. In particular, the historical distribution of provider devices may include additional information including historical provider device efficiency metrics. For example, the historical distribution of provider devices may comprise transportation requests and times that provider devices are without a passenger when filling the transportation requests. In at least one embodiment, the historical distribution of provider devices comprises estimated times to the pickup location. For example, the historical distribution of provider devices may include transportation requests and nearest driver estimated times to pickup locations.

The efficiency metric matching system 114 performs the act 704 of generating a transition probability matrix. As part of performing the act 704, the efficiency metric matching system 114 determines provider devices within one or more efficiency metric groupings based on the historical distribution of provider devices. In particular, the efficiency metric matching system 114 generates the one or more efficiency metric groupings based on the historical mean and variance of provider device efficiency metrics. For example, the efficiency metric matching system 114 accesses historical provider device efficiency metrics associated with transportation requests corresponding to the location. For instance, and as illustrated by an original efficiency metric matrix in FIG. 7, the efficiency metric matching system 114 determines a first efficiency metric grouping comprising provider devices having provider device efficiency metrics between 0 and 5 minutes. The efficiency metric matching system 114 determines additional efficiency metric groupings comprising provider devices having provider device efficiency metrics between 5-10 minutes, and 10-15 minutes. Though not illustrated, the efficiency metric matching system 114 may create additional efficiency metric groupings. In at least one embodiment, the efficiency metric matching system 114 creates a fixed number of efficiency metric groupings (e.g., 20). In at least one embodiment, the efficiency metric matching system 114 tailors the efficiency metric groupings to a geographic location by accessing historical data specific to the location associated with the transportation request.

Additionally, or alternatively, the efficiency metric matching system 114 generates groupings based on estimated time of arrival at the pickup location instead of provider device efficiency metrics. For instance, the efficiency metric matching system 114 may analyze the historical distribution of provider devices to find the historical mean and variance for nearest driver estimated times of arrival.

Furthermore, the efficiency metric matching system 114 performs the act 704 of generating the transition probability matrix by generating probabilities of identifying provider devices within each of the efficiency metric groupings across time cycles. In particular, the efficiency metric matching system 114 determines the probability that, given an original provider device efficiency metric, the efficiency metric matching system 114 will identify a provider device in a different efficiency metric within the time cycle. To do so, the efficiency metric matching system 114 will, within the time cycle, identify a provider device in a different efficiency metric matching system 114 analyzes the historical distribution of provider devices over time.

To illustrate, the transition probability matrix illustrated in FIG. 7 includes the original efficiency metric axis 708 and a new efficiency metric axis 710. For example, if the original efficiency metric within a first time cycle is between 5 to 10 minutes, the efficiency metric matching system 114 determines that the probability that the efficiency metric matching system 114 will find a provider device with a shorter provider device efficiency metric (e.g., 0-5 minutes) in the next time cycle equals 0.14. Similarly, the probability that the efficiency metric matching system 114 will identify a provider device with a similar provider device efficiency metric in the next time cycle equals 0.59.

As further illustrated in FIG. 7, the efficiency metric matching system 114 performs the act 706 of determining a threshold provider device efficiency metric. As part of performing the act 706, the efficiency metric matching system 114 applies the transition probability matrix to current provider devices to determine probabilities that provider devices will become available in future time cycles given the current provider devices. For example, the efficiency metric matching system 114 can determine the threshold provider device efficiency metric by applying the transition probability matrix to the current provider device efficiency metric to determine an anticipated provider device efficiency metric for future time cycles. Specifically, the system can apply the entries of the transition probability matrix to the current provider device efficiency metric and combine the results to determine a threshold provider device efficiency metric.

Alternatively, the efficiency metric matching system 114 can also utilize the average provider device efficiency metric from a current efficiency metric grouping as the threshold provider device efficiency metric. For example, if the average provider device efficiency metric is 3 for all provider devices in a current efficiency metric grouping of provider device efficiency metrics from 0 to 5, the efficiency metric matching system 114 can utilize 3 as the threshold provider device efficiency metric. In this manner, if the expected provider device efficiency metric overall is predicted to drop, the efficiency metric matching system 114 can avoid selecting a provider device that is below average with respect to the current time cycle.

Furthermore, and as previously mentioned, the efficiency metric matching system 114 also considers the future time window when performing the act 706 of determining the threshold provider device efficiency metric. In particular, the efficiency metric matching system 114 takes into account the number of remaining time cycles within the time cycle before the dispatch deadline when determining the threshold provider device efficiency metric. For example, in one embodiment, based on determining that the number of remaining time cycles before the dispatch deadline equals 0, the efficiency metric matching system 114 can define the threshold provider device efficiency metric as the mean provider device efficiency metric of current provider devices to ensure the dispatch of a provider device. In contrast, when the efficiency metric matching system 114 determines that several time cycles remain before the dispatch deadline, the efficiency metric matching system 114 may determine a threshold provider device efficiency metric with higher criteria based on having additional time cycles to select a provider device.

In particular, the threshold provider device efficiency metric comprises an expected provider device efficiency metric for a given time cycle. The efficiency metric matching system 114 may utilize the following equation to generate the threshold provider device efficiency metric:

$$V(i, c) = \min\left\{M(i), \sum_j P(i, j) \cdot V(j, c-1)\right\}$$

In particular, V(i, c) comprises the threshold provider device efficiency metric given that, within a given time cycle, the provider device having the best provider device efficiency metric (e.g., having the lowest time without a passenger prior to fulfilling the transportation request) is in the current efficiency metric grouping i (e.g., 10-15 minutes) with c number of remaining time cycles before the dispatch deadline.

As outlined in the above equation, the efficiency metric matching system 114 determines the lowest possible threshold provider device efficiency metric. In particular, M(i) comprises the mean or average provider device efficiency metric of provider devices within the current efficiency metric grouping i. P(i,j) represents the probability that, given the lowest provider device efficiency metric in the given time cycle is currently in the current efficiency metric grouping i, that the lowest provider device efficiency metric in the next time cycle will be in efficiency metric grouping j. In particular, the efficiency metric matching system 114 may utilize the transition probability matrix to determine P(i,j). Finally, V(j, c−1) represents the expected provider device efficiency metric given that the provider device having the best provider device efficiency metric will be in efficiency metric grouping j within the next time cycle (c−1).

As mentioned previously, the efficiency metric matching system 114 provides a transportation user interface for display at a requestor device. FIGS. 8A-9B provider examples of various graphical user interfaces generated and transmitted by the efficiency metric matching system 114 in accordance with one or more embodiments. In particular, FIGS. 8A-8C illustrate a series of example graphical user interfaces including a transportation user interface comprising multiple transportation options in accordance with one or more embodiments. FIG. 8A illustrates a transportation user interface including various transportation options in accordance with one or more embodiments. FIG. 8B illustrates an example pickup location confirmation user interface presented by the requestor device based on detecting selection of a transportation option. FIG. 8C illustrates an example transportation option summary user interface that summarizes the selected transportation option in accordance with one or more embodiments.

FIG. 8A illustrates a transportation user interface 804 on a screen (e.g., a display) 802 of a requestor device 800. The transportation user interface 804 comprises a destination location element, a map portion 806, and various transportation options including a time window transportation option 808 and a fixed time transportation option 810. The transportation user interface 804 also includes an option confirmation element 820.

As illustrated in FIG. 8A, the transportation user interface 804 includes a destination location element 815. Generally, the destination location element 815 indicates a pickup location and a destination location. Based on receiving a selection of the destination location element 815, the requestor device 800 can update the transportation user interface 804 to present elements for changing either the pickup location and/or the destination location. For instance, based on selection of the destination location element 815, the requestor device 800 presents a user interface including a destination location revision element and a pickup location revision element by which the requestor device 800 receives new pickup and/or destination locations.

As further illustrated in FIG. 8A, the transportation user interface 804 includes the map portion 806. The map portion 806 includes a requestor device indicator 801, a pickup location indicator 803, and a destination location indicator 805. The requestor device indicator 801 indicates the current location of the requestor device. The pickup location indicator 803 marks the geographical location designated as the pickup location, and the destination location indicator 805 marks the geographic location of the destination location (e.g., the location from the destination location element 815). The map portion 806 also includes a predicted route from the pickup location indicator 803 to the destination location indicator 805.

As mentioned, the transportation user interface 804 also includes various transportation options. Notably, the transportation user interface 804 illustrated in FIG. 8A includes the time window transportation option 808 and the fixed time transportation option 810. The time window transportation option 808 includes information associated with potential provider devices that the efficiency metric matching system 114 will select based on a threshold provider device efficiency metric. The time window transportation option 808 includes a time window transportation value 812 and a future time window 814. The time window transportation value 812 indicates the cost of the time window transportation option 808. The future time window 814 indicates the predicted time window within which a provider vehicle will fulfill the transportation request (e.g., drop the requestor device off at the destination location). Though not illustrated, in some embodiments, in addition to or instead of displaying a future time window that corresponds to dropping off the requestor device, the future window corresponds to a period for picking up the requestor device from the pickup location. For example, in at least one embodiment, the future time window 814 comprises an interactive element, the selection of which causes the requestor device 800 to update the transportation user interface 804 to display a pickup time window.

The transportation user interface 804 illustrated in FIG. 8A also includes the fixed time transportation option 810. Generally, the fixed time transportation option 810 includes information for a predicted provider device associated with a fixed arrival time. As mentioned previously, the efficiency metric matching system 114 selects the predicted provider device based on several factors including the shortest estimated time of time to the pickup location, lowest transportation value, closest proximity, provider rating, and other factors. The fixed time transportation option 810 provides information including a fixed time transportation value 816 and a drop-off time 818. The drop-off time 818 indicates the time at which the efficiency metric matching system 114 predicts the provider device will drop the requestor device off at the destination location. As with the time window transportation option 808, the efficiency metric matching system 114 may provide a pickup time in addition to or in place of the drop-off time 818.

The efficiency metric matching system 114 may provide any number or variety of additional transportation options for display within the transportation user interface 804. For instance, as illustrated in FIG. 8A, the transportation user interface 804 includes a shared transportation option 807 including a shared transportation value 811 and a shared transportation time 813. The efficiency metric matching system 114 provides additional transportation options such as options involving different types of transportation vehicles (e.g., luxury, SUV, van, etc.), different modes of transportation (e.g., public transit, bikeshare, scooters, etc.), different numbers of passengers, or other options.

The transportation user interface 804 also includes the option confirmation element 820. In general, based on detecting interaction with the option confirmation element 820, the requestor device 800 confirms the selection of a transportation option. For instance, as illustrated in FIG. 8A, the transportation user interface 804 indicates selection of the time window transportation option 808 by including a border around the time window transportation option 808. The efficiency metric matching system 114 may indicate selection of a transportation option utilizing different user interface elements. For instance, the efficiency metric matching system 114 may highlight the selected transportation option or display the text of the selected transportation option using different a different font, text, color, or size.

In at least one embodiment, based on detecting selection of the option confirmation element 820, the requestor device 800 updates the graphical user interface to present a pickup location confirmation user interface. FIG. 8B illustrates a pickup location confirmation user interface 822 displayed on the screen 802 of the requestor device 800. The pickup location confirmation user interface 822 includes elements and features for displaying information relevant to the desired pickup location. In particular, the pickup location confirmation user interface 822 includes a map portion 824 and a confirmation portion 826 comprising a pickup location element 832 and a pickup confirmation element 828.

As illustrated in FIG. 8B, the pickup location confirmation user interface 822 includes the map portion 824. The map portion 824 displays geographic information regarding the pickup location. As illustrated, the map portion 824 includes a zoomed in view of the pickup location indicator 803 and the requestor device indicator 801. The map portion 824 includes information that aids the requestor associated with the requestor device in navigating to the pickup location. For example, the map portion 824 includes an orientation of the requestor device by including an arrow pointing in the direction in which the requestor device 800 is facing. Additionally, the map portion 824 includes a recommended route between the requestor device indicator 801 and the pickup location indicator 803.

The pickup location confirmation user interface 822 illustrated in FIG. 8B also includes a transportation option element 834. The transportation option element 834 comprises a selectable element, the selection of which causes the requestor device 800 to present the transportation user interface 804 illustrated in FIG. 8A. More particularly, based on selection of the transportation option element 834, the efficiency metric matching system 114 provides transportation options for display via the pickup location confirmation user interface 822.

Additionally, as illustrated in FIG. 8B, the pickup location confirmation user interface 822 includes the confirmation portion 826. Generally, the confirmation portion 826 includes information specific to the pickup location. In particular, the confirmation portion 826 includes the pickup location element 832. The pickup location element 832 displays an address associated with the determined pickup location. For example, the efficiency metric matching system 114 may receive a request to designate the current location of the requestor device 800 as the pickup location. The efficiency metric matching system 114 may display, via the pickup location element 832, a physical address associated with the current location of the requestor device 800 to confirm the accuracy of the determined location.

Furthermore, as illustrated in FIG. 8B, the confirmation portion 826 includes an additional note element 830. Based on a selection of the additional note element 830, the efficiency metric matching system 114 provides a note user interface by which the efficiency metric matching system 114 receives notes to send to the provider device. In cases where the efficiency metric matching system 114 has not yet selected a provider device (i.e., the efficiency metric matching system 114 will select the provider device within the future time window), the efficiency metric matching system 114 stores additional notes and sends them to a provider device at the time that the efficiency metric matching system 114 selects the provider device to fulfill the transportation request.

The confirmation portion 826 illustrated in FIG. 8B also includes the pickup confirmation element 828. The pickup confirmation element 828 comprises an interactive graphical user interface element. The requestor device 800 generates and sends a transportation request to the efficiency metric matching system 114 based on selection of the pickup confirmation element 828. In particular, the requestor device 800 may compile information received via the transportation user interface 804 (illustrated in FIG. 8A) and the pickup location confirmation user interface 822 and send it to the efficiency metric matching system 114.

In at least one embodiment, based on a user selection of the pickup confirmation element 828, the requestor device 800 updates the graphical user interface to present a transportation option summary user interface for finalizing details associated with the transportation request. FIG. 8C illustrates an example transportation option summary user interface in accordance with one or more embodiments. In particular, FIG. 8C illustrates a transportation option summary user interface 836 presented on the screen 802 of the requestor device 800. The transportation option summary user interface 836 includes a map portion 838 and a transportation request summary portion 848 comprising a pickup window 840, a transportation value savings indicator 842, and an edit ride element 846.

As illustrated in FIG. 8C, the transportation option summary user interface 836 comprises the map portion 838. Generally, the map portion 838 depicts the locations of the requestor device, the pickup location, and the destination location. More specifically, the map portion 838 includes the requestor device indicator 801, the pickup location indicator 803, and the destination location indicator 805.

Furthermore, as illustrated in FIG. 8C, the transportation option summary user interface 836 includes the transportation request summary portion 848. The transportation request summary portion 848 displays information specific to the time window transportation option. For instance, the transportation request summary portion 848 includes the pickup window 840. As described previously, the pickup window 840 comprises the predicted time period in which a provider device will arrive at the pickup location.

As illustrated in FIG. 8C, the transportation request summary portion 848 also includes notification information 852. Generally, the efficiency metric matching system 114 sends notifications to the requestor device 800 at events during the fulfillment of the transportation request. In one embodiment, the efficiency metric matching system 114 provides a notification to the requestor device 800 based on selecting a provider device to fulfill the transportation request within the future time window. For example, as illustrated, the notification information 852 indicates to the requestor that the efficiency metric matching system 114 will send a notification to the requestor device 800 when the efficiency metric matching system 114 selects and dispatches a provider device. In other embodiments, the efficiency metric matching system 114 provides additional notifications such as when the selected provider device has completed a previous ride request and is en route to the pickup location, when the provider device is within a threshold distance of the pickup location, and/or when the provider device has arrived at the pickup location.

In one or more embodiments, the efficiency metric matching system 114 may associate special types of notifications with time window transportation options and indicate the special types of notifications via the notification information 852. The efficiency metric matching system 114 may provide one type of notification for fixed time transportation options and another type of notification for events within the time window transportation option. For example, in at least one embodiment, the efficiency metric matching system 114 may send instructions to the requestor device to vibrate more aggressively or emit distinct notification sounds for events occurring during a time window transportation request. The efficiency metric matching system 114 provides indications of what types of notifications will be issued via the notification information 852 illustrated in FIG. 8C.

As further illustrated in FIG. 8C, the transportation option summary user interface 836 also includes a future time window element 850. The future time window element 850 indicates the future time window within which the provider device will arrive at the destination location corresponding to the transportation request.

The transportation request summary portion 848 illustrated in FIG. 8C may also include a transportation value savings indicator 842. As mentioned previously, the efficiency metric matching system 114 may associate a lower transportation value with a time window transportation option than with a fixed time transportation option. The transportation value savings indicator 842 displays the difference between the fixed time transportation option and the time window transportation option.

FIG. 8C further illustrates an edit ride element 846 and an additional information element 844. Based on a selection of the edit ride element 846, the efficiency metric matching system 114 may provide additional user interface features and elements for modifying the transportation request. For example, the efficiency metric matching system 114 may provide options for modifying the pickup location, the destination location, and even switching from the time window transportation option to the fixed time transportation option. Furthermore, the transportation option summary user interface 836 includes the additional information element 844. Based on user selection of the additional information element 844, the efficiency metric matching system 114 may provide information regarding time window transportation options in general. For instance, the efficiency metric matching system 114 may provide a notification detailing the provider device efficiency metrics or other additional information.

Figure 9B:
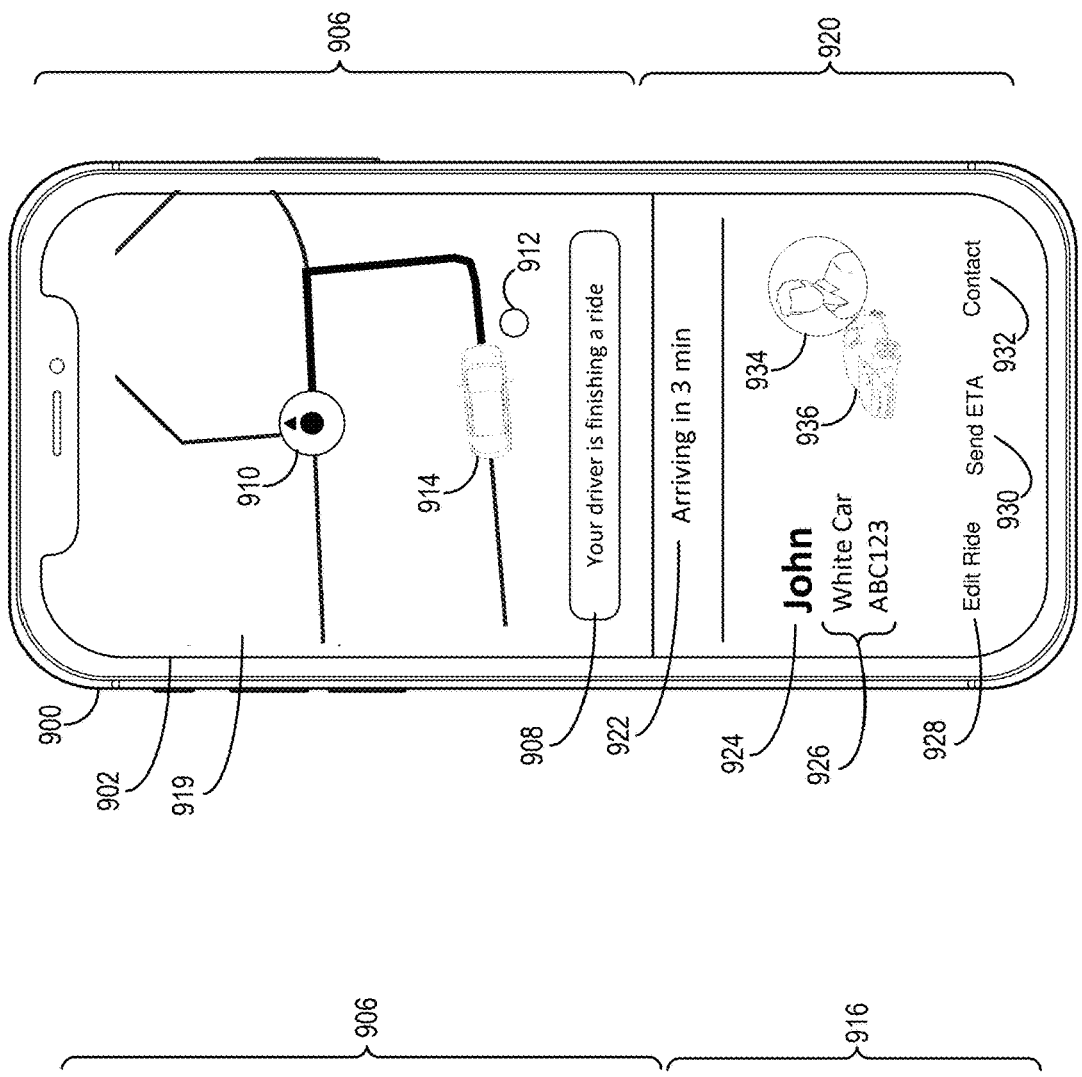
FIGS. 9A-9B illustrate example provider device selection user interfaces for notifying a requestor device that the system has selected a provider device to fulfill a transportation request.
Figure 9A:
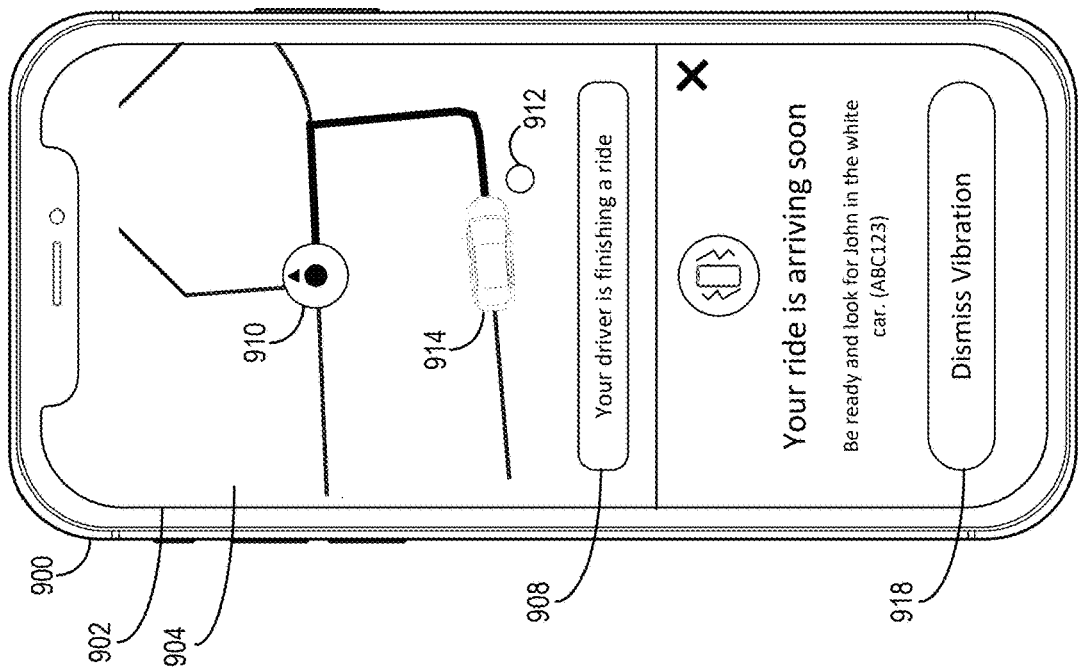

As mentioned above, the efficiency metric matching system 114 can provide a notification to the requestor device indicating when the efficiency metric matching system 114 has selected a provider device to fulfill the transportation request. FIGS. 9A-9B illustrate example provider device selection user interfaces for notifying the requestor that the efficiency metric matching system 114 has selected a provider device to fulfill the transportation request. In particular, FIG. 9A illustrates a provider device selection user interface comprising a provider device selection notification. FIG. 9B illustrates a provider device selection user interface comprising provider device information.

FIG. 9A illustrates a provider device selection user interface 904 presented on a screen 902 of a requestor device 900. Generally, the provider device selection user interface 904 presents a notification of and a summary of information associated with the selected provider device. The provider device selection user interface 904 includes a map portion 906 and a provider device selection notification 916. The map portion 906 comprises a requestor device indicator 910 corresponding to the location of the requestor device 900 and a provider device indicator 914 corresponding to the location of the selected provider device.

In at least one embodiment, and as illustrated in FIG. 9A, the efficiency metric matching system 114 provides information regarding a prior passenger associated with the selected provider device. In particular, as mentioned, the efficiency metric matching system 114 may select a provider device to fulfill a transportation request, even if the provider device is currently fulfilling a prior transportation request. In such instances, the efficiency metric matching system 114 may provide details relating to the prior transportation request. For instance, the map portion 906 includes a prior passenger destination indicator 912 and a provider device progress indicator 908. The prior passenger destination indicator 912 represents the location of a destination location for a prior passenger relative to the pickup location for the requestor device 900. The provider device selection user interface 904 also includes the provider device progress indicator 908. The provider device progress indicator 908 comprises status information of the provider device. The efficiency metric matching system 114 may update the provider device progress indicator 908 in real time to indicate the most recent status of the provider device. For example, the provider device progress indicator 908 can indicate that a provider device is picking up a prior requestor device, en route to a prior destination location, and/or en route to the pickup location. Additionally, the provider device progress indicator 908 may indicate that the provider device has just come online and has begun traveling to the pickup location.

The provider device selection user interface 904 illustrated in FIG. 9A further comprises a provider device selection notification 916. The efficiency metric matching system 114 may transmit the provider device selection notification 916 for display upon selecting a provider device to fulfill the transportation request. As illustrated, the efficiency metric matching system 114 may pair the presentation of the provider device selection notification 916 with a vibration or ring alert. Furthermore, the provider device selection notification 916 includes information pertaining to the selected provider device. For instance, and as illustrated, the provider device selection notification 916 includes a provider identifier (e.g., the name of a provider) and identifying vehicle information such as a vehicle description (e.g., color, type, make, model, etc.) and/or the license plate identification.

Furthermore, as illustrated in FIG. 9A, the provider device selection user interface 904 comprises a notification dismissal element 918. Based on detecting selection of the notification dismissal element 918, the requestor device 900 terminates a notification sound or vibration. For instance, the requestor device 900 may vibrate and/or emit a notification sound until detecting selection of the notification dismissal element 918.

Based on dismissing the notification, the efficiency metric matching system 114 may provide additional provider device information for display at the requestor device 900. As illustrated in FIG. 9B, the efficiency metric matching system 114 can provide a provider device information user interface 919 for display via the screen 902 of the requestor device 900. The provider device information user interface 919 comprises the map portion 906 as well as a provider device information portion 920. In particular, the provider device information portion 920 comprises details specific to the selected provider device. For example, the provider device information portion 920 comprises a provider device arrival time 922, a provider identifier 924, vehicle identifier(s) 926, and additional elements.

As mentioned, and as illustrated in FIG. 9B, the provider device information portion 920 includes the provider device arrival time 922. In particular, the provider device arrival time 922 comprises the predicted amount of time required for the provider device to arrive at the pickup location. Additionally, or alternatively, the efficiency metric matching system 114 may provide an indication of when the provider vehicle will drop the requestor device 900 off at the destination location. More specifically, the efficiency metric matching system 114 can provide a predicted drop-off time for display within the provider device information portion 920.

Furthermore, as illustrated in FIG. 9B, the provider device information portion 920 includes information identifying the provider and/or the provider vehicle associated with the selected provider device. In particular, the provider device information user interface 919 includes the provider identifier 924 (i.e., the provider's name) and a provider avatar 934 to assist the requestor in identifying the provider. Furthermore, the provider device information user interface 919 includes the vehicle identifier(s) 926 including descriptive information relating to the provider vehicle (e.g., white car) and the license plate identification in addition to a provider vehicle avatar 936 providing a depiction of the provider vehicle.

As illustrated in FIG. 9B, the provider device information portion 920 includes additional interactive elements associated with additional features associated with the transportation request. In particular, the provider device information portion 920 includes an edit ride element 928. The efficiency metric matching system 114 may determine to modify the transportation request based on selection of the edit ride element 928. For instance, the efficiency metric matching system 114 can modify the pickup location, destination location, type of vehicle, or any number of transportation request parameters. In some embodiments, based on selection of the edit ride element 928, the efficiency metric matching system 114 provides an option to cancel the transportation request.

Additionally, as illustrated in FIG. 9B, the provider device information portion 920 includes a send ETA element 930. In particular, based on selection of the send ETA element 930, the efficiency metric matching system 114 communicates information corresponding to the transportation request to a contact associated with the requestor device 900. For example, based on selection on the send ETA element 930, the efficiency metric matching system 114 may generate a message comprising a link to information including an estimated time of arrival to the destination location, route information, location information associated with the requestor device 900 and the provider device, and details associated the provider device. In particular, the efficiency metric matching system 114 can include, within the linked information, a photo of the provider, and identifying information associated with the provider vehicle such as the vehicle color, make, model, and license plate identification. The efficiency metric matching system 114 may send the link to a contact associated with the requestor device 900 via text messaging, email, or other type of messaging service associated with the requestor device 900.

FIG. 9B also illustrates a contact provider device element 932 within the provider device information portion 920 of the provider device information user interface 919. Based on selection of the contact provider device element 932, the efficiency metric matching system 114 initiates communication between the requestor device 900 and the selected provider device. For example, in at least one embodiment, based on selection of the contact provider device element 932, the efficiency metric matching system 114 provides communication options including sending a text message or initiating a phone call with the provider device.

As illustrated in FIG. 9B, the provider device information user interface 919 includes the map portion 906. The map portion 906 of the provider device information user interface 919 is similar to the map portion 906 displayed within the provider device selection user interface 904 illustrated in FIG. 9A. In particular, the map portion 906 includes the requestor device indicator 910, the provider device indicator 914, the prior passenger destination indicator 912, and the provider device progress indicator 908.

Figure 10:
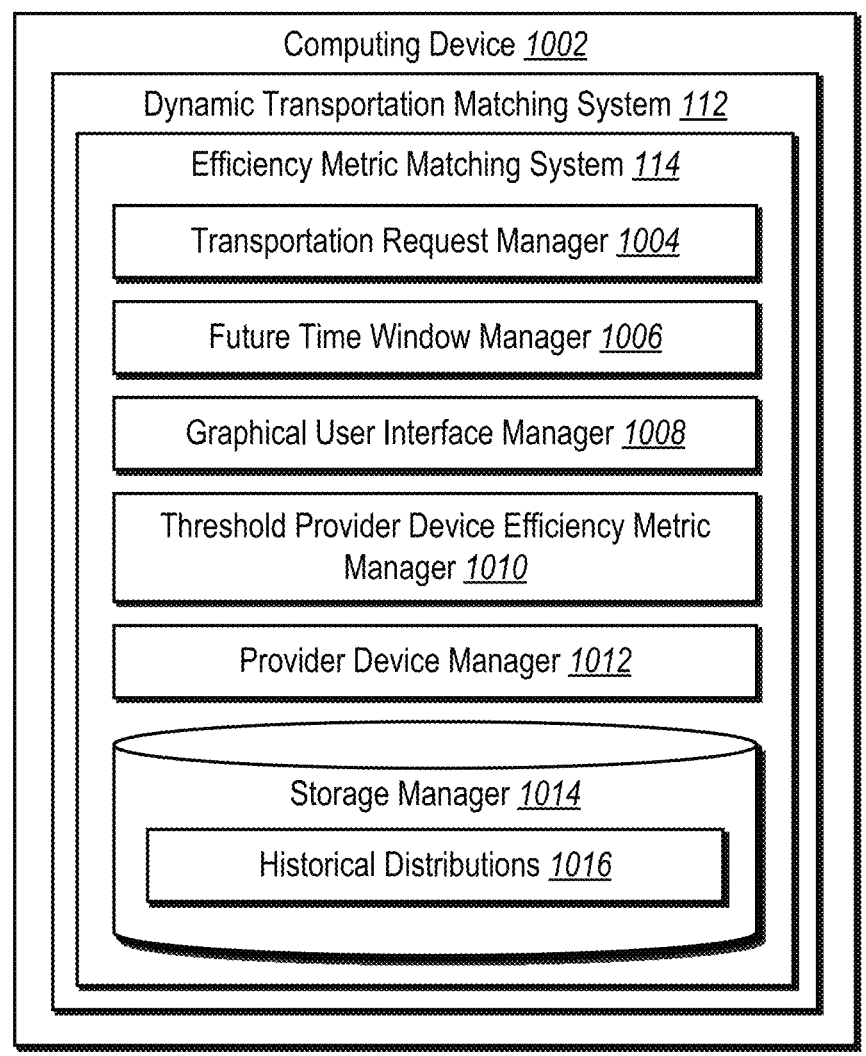
FIG. 10 illustrates a block diagram of an example computing device in accordance with one or more embodiments of the present disclosure.

FIGS. 1-9B, the corresponding text, and the examples provide several different systems, methods, techniques, components, and/or devices of the efficiency metric matching system 114 in accordance with one or more embodiments. FIG. 10 and the corresponding discussion provide additional detail regarding components and capabilities of the efficiency metric matching system 114. Specifically, FIG. 10 illustrates an example schematic diagram 1000 of the efficiency metric matching system 114 implemented within the dynamic transportation matching system 112 on an example computing device 1002 (e.g., one or more of the server(s) 110, the requestor device 116, and/or the provider devices 102a-102n). As shown in FIG. 10, the efficiency metric matching system 114 includes a transportation request manager 1004, a future time window manager 1006, a graphical user interface manager 1008, a threshold provider device efficiency metric manager 1010, a provider device manager 1012, and a storage manager 1014.

The efficiency metric matching system 114 illustrated in FIG. 10 includes the transportation request manager 1004. The transportation request manager 1004 generates, manages, and stores transportation requests from requestor devices. In particular, the transportation request manager 1004 compiles data including a pickup location, a selected transportation option (e.g., time window transportation option or fixed time transportation option), a destination location, and other relevant information within a transportation request. Additionally, the transportation request manager 1004 sends generated transportation requests to selected provider devices. Furthermore, the efficiency metric matching system 114 can store information regarding matched requestor device and provider devices.

As further illustrated in FIG. 10, the efficiency metric matching system 114 includes the future time window manager 1006. The future time window manager generates, manages, and stores future time windows corresponding to transportation requests. In particular, the future time window manager 1006 may analyze characteristics corresponding to a location associated with a transportation request to generate a future time window. For instance, the future time window manager 1006 can access and analyze region characteristics and/or device balance measure characteristics associated with the location to predict a future time window.

The efficiency metric matching system 114 also includes the graphical user interface manager 1008. In particular, the graphical user interface manager 1008 generates and provides graphical user interfaces, elements, and features for display at a client device. For instance, the graphical user interface manager 1008 can present user interfaces including a transportation user interface comprising various transportation options. Additionally, the graphical user interface manager 1008 receives instructions or communications from client devices to perform available actions. For instance, the graphical user interface manager 1008 may receive a selection of a transportation option and communicate the selection with other components of the efficiency metric matching system 114.

The efficiency metric matching system 114 also includes the threshold provider device efficiency metric manager 1010. The threshold provider device efficiency metric manager determines one or more threshold provider device efficiency metrics. In particular, the threshold provider device efficiency metric manager 1010 analyzes a future time window, current provider devices, and a historical distribution of provider devices to generate a threshold provider device efficiency metric for a time cycle.

Furthermore, as illustrated in FIG. 10, the efficiency metric matching system 114 includes the provider device manager 1012. Generally, the provider device manager 1012 accesses data corresponding to provider devices managed by the dynamic transportation matching system 112. In particular, the provider device manager 1012 manages data relating to current provider devices comprising available or vacant provider devices as well as provider devices engaged in fulfilling transportation requests.

The efficiency metric matching system 114 includes the storage manager 1014. The storage manager 1014 stores information utilized by the efficiency metric matching system 114. For instance, the efficiency metric matching system 114 may store training data for use in training any machine learning model utilized by the efficiency metric matching system 114. Additionally, the efficiency metric matching system 114 stores the historical distributions 1016. In particular, the historical distributions 1016 comprise a historical distribution of provider devices.

The components of the efficiency metric matching system 114 can include software, hardware, or both. For example, the components of the efficiency metric matching system 114 can include one or more instructions stored on a computer-readable storage medium and executable by processors of one or more computing devices (e.g., the computing device 1200). When executed by the one or more processors, the computer-executable instructions of the efficiency metric matching system 114 can cause the computing device 1002 to perform the methods described herein. Alternatively, the components of the efficiency metric matching system 114 can comprise hardware, such as a special purpose processing device to perform a certain function or group of functions. Additionally, or alternatively, the components of the efficiency metric matching system 114 can include a combination of computer-executable instructions and hardware.

Furthermore, the components of the efficiency metric matching system 114 performing the functions described herein may, for example, be implemented as part of a stand-alone application, as a module of an application, as a plug-in for applications including content management applications, as a library function or functions that may be called by other applications, and/or as a cloud-computing model. Thus, the components of the efficiency metric matching system 114 may be implemented as part of a stand-alone application on a personal computing device or a mobile device. Alternatively, or additionally, the components of the efficiency metric matching system 114 may be implemented in any application that allows creation and delivery of marketing content to users, including, but not limited to, various applications.

Figure 11:
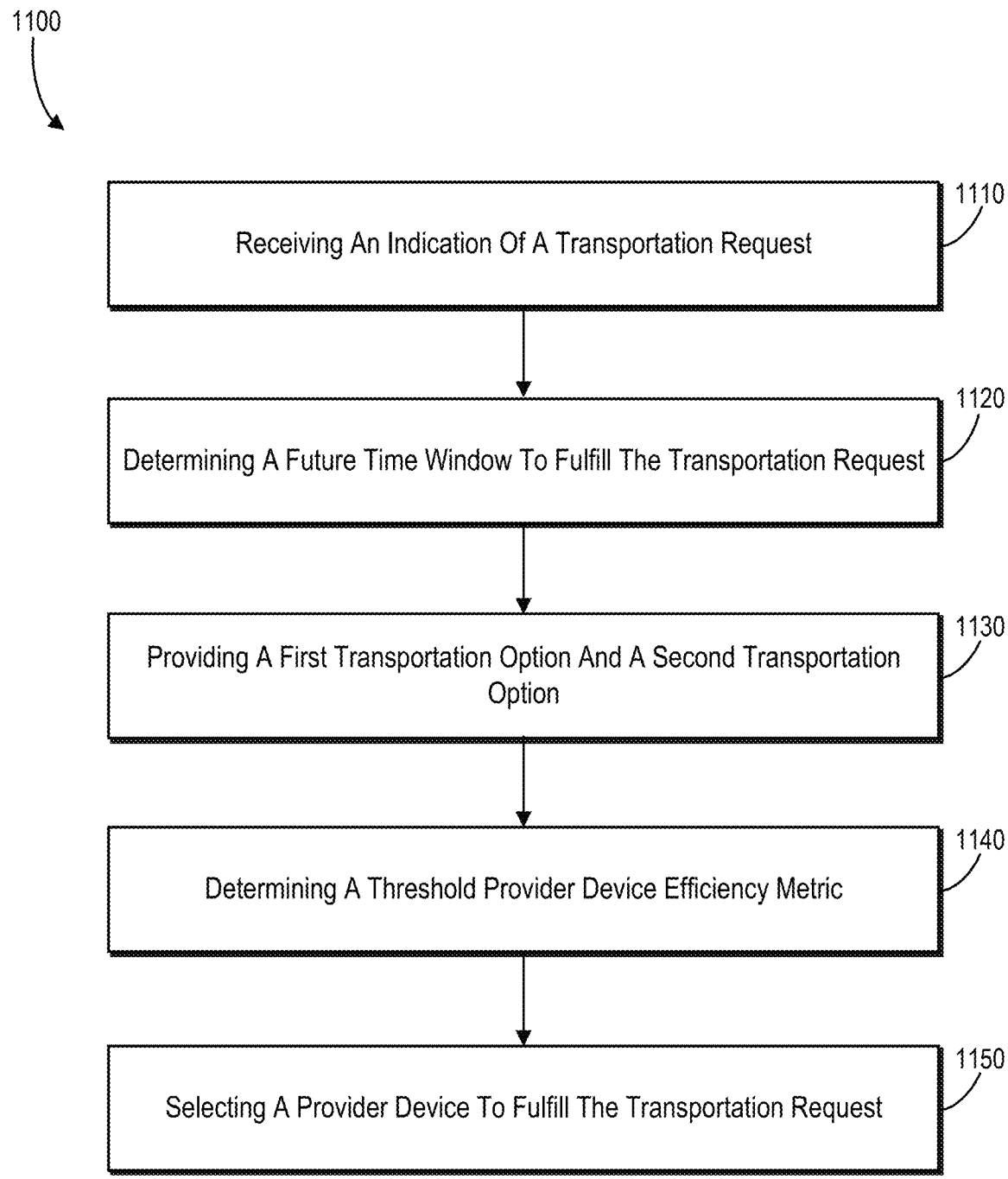
FIG. 11 illustrates a series of acts for selecting a provider device to fulfill a transportation request in accordance with one or more embodiments of the present disclosure.

In addition to the above descriptions, one or more embodiments can also be described in terms of flowcharts including acts for accomplishing a particular result. For example, FIG. 11 illustrates a flowchart of an example sequence of acts in accordance with one or more embodiments. In addition, the acts illustrated in FIG. 11 may be performed with more or fewer acts. Further, the acts may be performed in different orders. The acts described herein may be repeated or performed in parallel with one another or in parallel with different instances of the same or similar acts. The acts of FIG. 11 can be performed as part of a method. Alternatively, a non-transitory computer readable storage medium can comprise instructions that, when executed by one or more processors, cause a computing device to perform the acts depicted in FIG. 11. In still further embodiments, a system comprising one or more memory devices and one or more server devices can perform the acts of FIG. 11.

To illustrate, FIG. 11 includes a flowchart of a series of acts 1100 of selecting a provider device to fulfill a transportation request. As shown, the series of acts 1100 includes an act 1110 of receiving an indication of a transportation request. In particular, the act 1110 comprises receiving, from a requestor device, an indication of a transportation request corresponding to a location.

The series of acts 1100 includes an act 1120 of determining a future time window to fulfill the transportation request. In particular, the act 1120 comprises determining a future time window to fulfill the transportation request by analyzing characteristics corresponding to the location. The act 1120 may further comprise an act of determining the threshold provider device efficiency metric by determining a threshold time that a potential provider device can be without a passenger prior to fulfilling the transportation request based on the future time window, the current provider devices, and the historical distribution of provider devices. Additionally, the act 1120 may further comprise determining the characteristics corresponding to the location by at least one of: determining region characteristics indicating a density of points within a region; or determining device balance measure characteristics indicating current requestor devices and the current provider devices corresponding to the location.

Furthermore, the act 1120 may comprise an additional act of determining the threshold provider device efficiency metric by: determining a dispatch deadline for fulfilling the transportation request within the future time window; determining, at a first time, a number of remaining time cycles within the pickup window before the dispatch deadline; and predicting a first threshold provider device efficiency metric for the first time based on the number of remaining time cycles, the current provider devices, and the historical distribution of provider devices. In particular, the additional act may comprise the acts of determining, at a second time after the first time, an additional number of remaining time cycles within the pickup window before the dispatch deadline; and predicting a second threshold provider device efficiency metric for the second time. In at least one embodiment, the act 1120 further comprises an act of selecting the provider device by: predicting the provider device efficiency metrics for the current provider devices for the particular time cycle by determining estimated times that the current provider devices will be without passengers prior to fulfilling the transportation request; and determining that a provider device efficiency metric corresponding to the provider device satisfies the threshold provider device efficiency metric.

The series of acts 1100 also includes an act 1130 of providing a first transportation option and a second transportation option. In particular, the act 1130 comprises providing, for display via a transportation user interface of the requestor device, a first transportation option comprising a drop-off time and a first transportation value and a second transportation option comprising the future time window and a second transportation value.

As further illustrated in FIG. 11, the series of acts 1100 includes an act 1140 of determining a threshold provider device efficiency metric. In particular, the act 1140 comprises in response to selection of the second transportation option, determining a threshold provider device efficiency metric based on a pickup window corresponding to the future time window, current provider devices, and a historical distribution of provider devices. In at least one embodiment, the act 1140 further comprises an additional act of determining the threshold provider device efficiency metric based on the historical distribution of the provider devices by generating a transition probability matrix using the historical distribution, wherein the transition probability matrix indicates probabilities of changing provider device efficiency metrics between time cycles. Additionally, the act 1140 may further comprise an act of determining the current provider devices by identifying provider devices currently fulfilling different transportation requests.

The series of acts 1100 also includes an act 1150 of selecting a provider device to fulfill the transportation request. In particular, the act 1150 comprises selecting a provider device to fulfill the transportation request within the future time window by comparing predicted provider device efficiency metrics for the current provider devices with the threshold provider device efficiency metric. The act 1150 may further comprise the act of selecting the provider device by: predicting the provider device efficiency metrics for the current provider devices for the particular time cycle by determining estimated times that the current provider devices will be without passengers prior to fulfilling the transportation request; and determining that a provider device efficiency metric corresponding to the provider device satisfies the threshold provider device efficiency metric.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
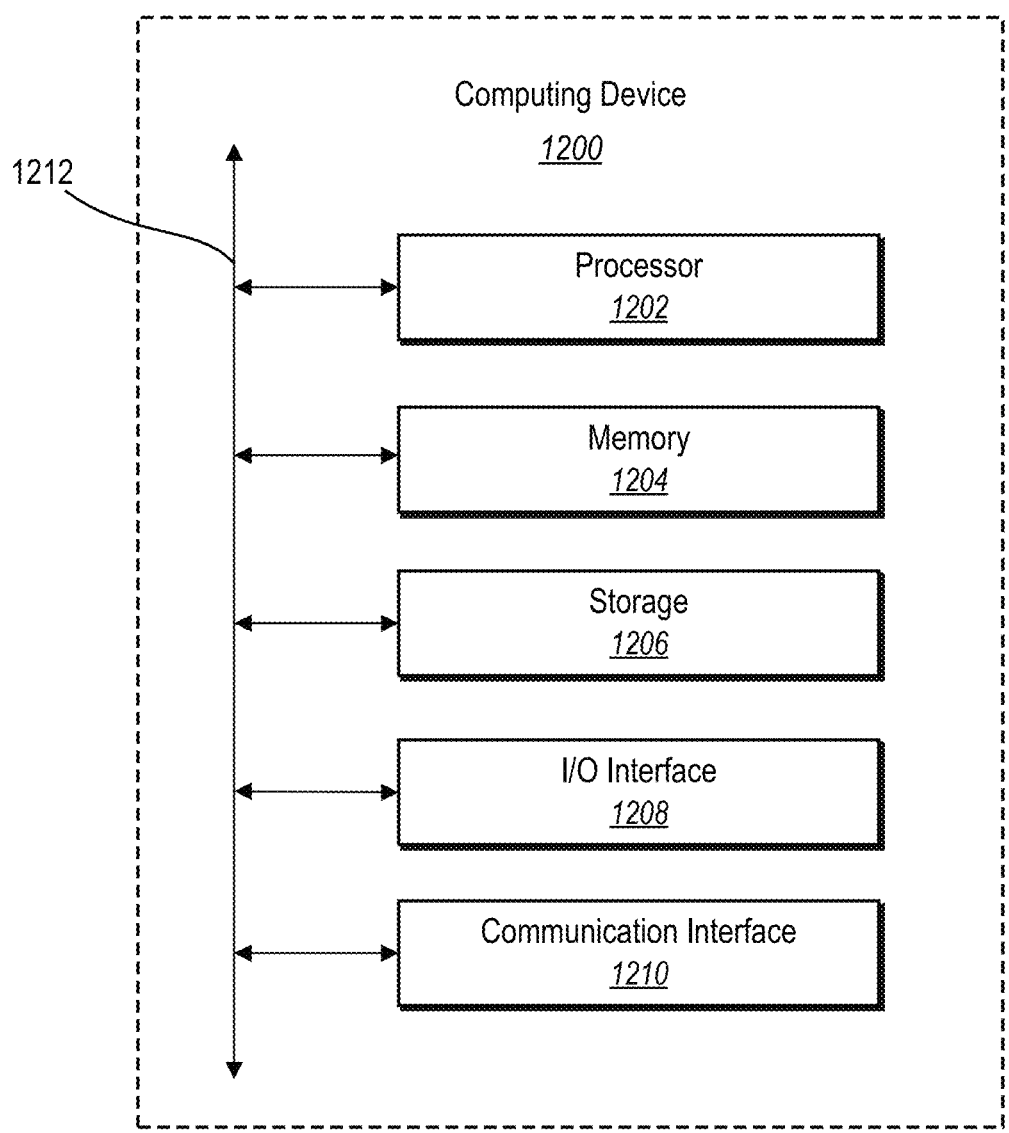
FIG. 12 illustrates a block diagram of an example computing device in accordance with one or more embodiments.

FIG. 12 illustrates, in block diagram form, an exemplary computing device 1200 (e.g., the computing device 1002, the server(s) 110, the provider devices 102a-102n, and/or the requestor device 116) that may be configured to perform one or more of the processes described above. One will appreciate that the efficiency metric matching system 114 can comprise implementations of the computing device 1200, including, but not limited to, the requestor device 116, the provider devices 102a-102n, and/or the server(s) 110. As shown by FIG. 12, the computing device can comprise a processor 1202, memory 1204, a storage device 1206, an I/O interface 1208, and a communication interface 1210. In certain embodiments, the computing device 1200 can include fewer or more components than those shown in FIG. 12. Components of computing device 1200 shown in FIG. 12 will now be described in additional detail.

In particular embodiments, the processor 1202 includes hardware for executing instructions, such as those making up a computer program. As an example, and not by way of limitation, to execute instructions, the processor 1202 may retrieve (or fetch) the instructions from an internal register, an internal cache, memory 1204, or a storage device 1206 and decode and execute them.

The computing device 1200 includes memory 1204, which is coupled to the processor 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive ("HDD"), flash memory, a Universal Serial Bus ("USB") drive or a combination of these or other storage devices.

The computing device 1200 also includes one or more input or output interface 1208 (or "I/O interface 1208"), which are provided to allow a user (e.g., requester or provider) to provide input to (such as user strokes), receive output from, and otherwise transfer data to and from the computing device 1200. The I/O interface 1208 may include a mouse, keypad or a keyboard, a touch screen, camera, optical scanner, network interface, modem, other known I/O devices or a combination of such. The touch screen may be activated with a stylus or a finger.

The I/O interface 1208 may include one or more devices for presenting output to a user, including, but not limited to, a graphics engine, a display (e.g., a display screen), one or more output providers (e.g., display providers), one or more audio speakers, and one or more audio providers. In certain embodiments, interface 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller ("NIC") or network adapter for communicating with an Ethernet or other wire-based network or a wireless NIC ("WNIC") or wireless adapter for communicating with a wireless network, such as a WI-FI. The computing device 1200 can further include a bus 1212. The bus 1212 can comprise hardware, software, or both that connects components of computing device 1200 to each other.

Figure 13:
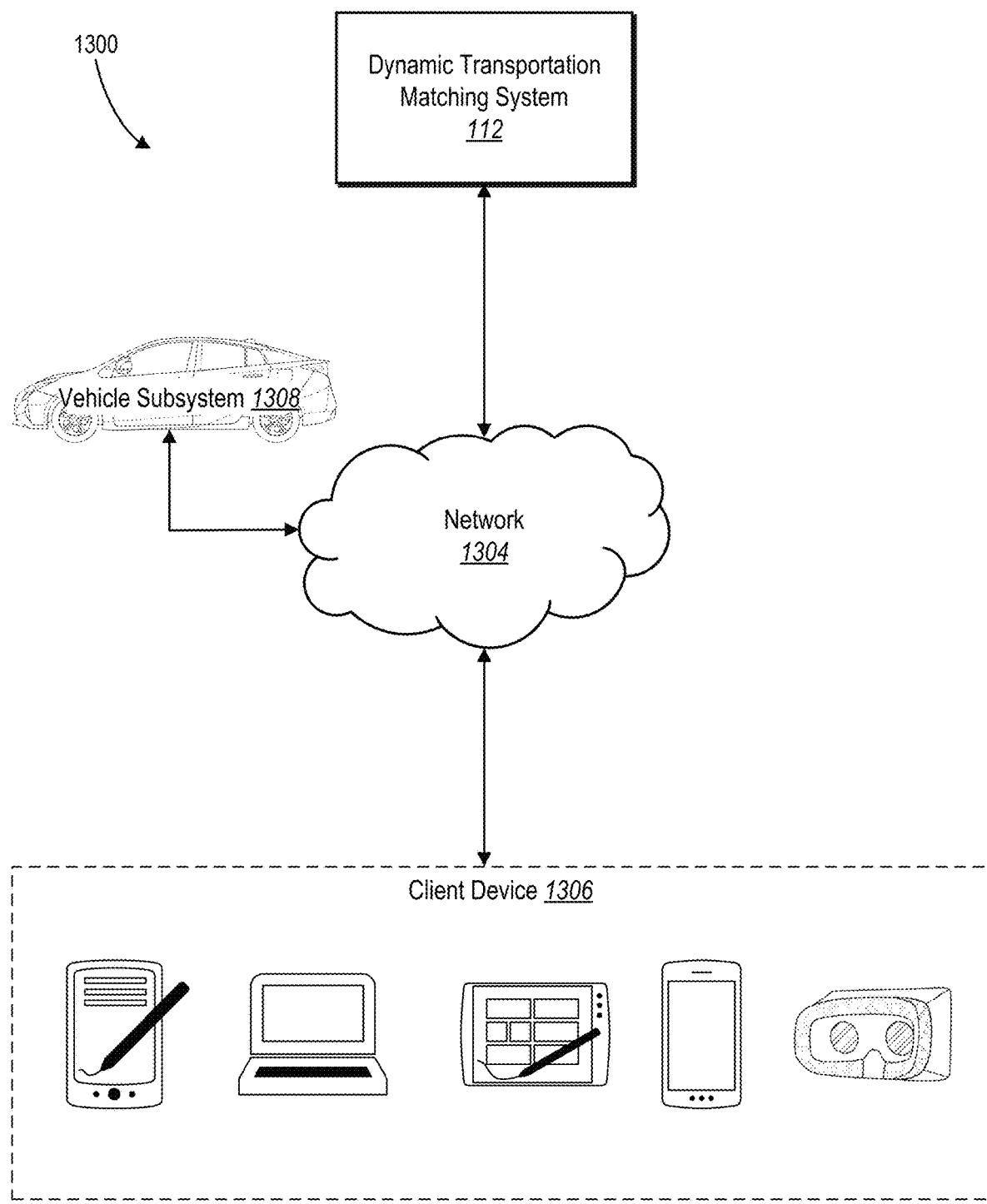
FIG. 13 illustrates an example environment for a dynamic transportation matching system in accordance with one or more embodiments of the present disclosure.

FIG. 13 illustrates an example network environment 1300 of the dynamic transportation matching system 112. The network environment 1300 includes a client device 1306 (e.g., the requestor device 116 or the provider devices 102(a0-102n), the dynamic transportation matching system 112, and a vehicle subsystem 1308 connected to each other by a network 1304. Although FIG. 13 illustrates a particular arrangement of the client device 1306, the dynamic transportation matching system 112, the vehicle subsystem 1308, and the network 1304, this disclosure contemplates any suitable arrangement of client device 1306, the dynamic transportation matching system 112, the vehicle subsystem 1308, and the network 1304. As an example, and not by way of limitation, two or more of client device 1306, the dynamic transportation matching system 112, and the vehicle subsystem 1308 communicate directly, bypassing network 1304. As another example, two or more of client device 1306, the dynamic transportation matching system 112, and the vehicle subsystem 1308 may be physically or logically co-located with each other in whole or in part.

Moreover, although FIG. 13 illustrates a particular number of client devices 1306, dynamic transportation matching system 112, vehicle subsystems 1308, and networks 1304, this disclosure contemplates any suitable number of client devices 1306, dynamic transportation matching system 112, vehicle subsystems 1308, and networks 1304. As an example, and not by way of limitation, network environment 1300 may include multiple client device 1306, dynamic transportation matching system 112, vehicle subsystems 1308, and/or networks 1304.

This disclosure contemplates any suitable network 1304. As an example, and not by way of limitation, one or more portions of network 1304 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1304 may include one or more networks 1304.

Links may connect client device 1306, efficiency metric matching system 114, and vehicle subsystem 1308 to network 1304 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1300. One or more first links may differ in one or more respects from one or more second links.

In particular embodiments, the client device 1306 may be an electronic device including hardware, software, or embedded logic components or a combination of two or more such components and capable of carrying out the appropriate functionalities implemented or supported by client device 1306. As an example, and not by way of limitation, a client device 1306 may include any of the computing devices discussed above in relation to FIG. 12. A client device 1306 may enable a network user at the client device 1306 to access network 1304. A client device 1306 may enable its user to communicate with other users at other client devices 1306.

In particular embodiments, the client device 1306 may include a requester application or a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at the client device 1306 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1306 one or more Hyper Text Markup Language ("HTML") files responsive to the HTTP request. The client device 1306 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, dynamic transportation matching system 112 may be a network-addressable computing system that can host a transportation matching network. The dynamic transportation matching system 112 may generate, store, receive, and send data, such as, for example, user-profile data, concept-profile data, text data, transportation request data, GPS location data, provider data, requester data, vehicle data, or other suitable data related to the transportation matching network. This may include authenticating the identity of providers and/or vehicles who are authorized to provide transportation services through the dynamic transportation matching system 112. In addition, the dynamic transportation matching system 112 may manage identities of service requesters such as users/requesters. In particular, the dynamic transportation matching system 112 may maintain requester data such as driving/riding histories, personal data, or other user data in addition to navigation and/or traffic management services or other location services (e.g., GPS services).

In particular embodiments, the dynamic transportation matching system 112 may manage transportation matching services to connect a user/requester with a vehicle and/or provider. By managing the transportation matching services, the dynamic transportation matching system 112 can manage the distribution and allocation of resources from vehicle systems and user resources such as GPS location and availability indicators, as described herein.

The dynamic transportation matching system 112 may be accessed by the other components of network environment 1300 either directly or via network 1304. In particular embodiments, the dynamic transportation matching system 112 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the dynamic transportation matching system 112 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1306, or a dynamic transportation matching system 112 to manage, retrieve, modify, add, or delete, the information stored in data store.

In particular embodiments, the dynamic transportation matching system 112 may provide users with the ability to take actions on various types of items or objects, supported by the dynamic transportation matching system 112. As an example, and not by way of limitation, the items and objects may include transportation matching networks to which users of the dynamic transportation matching system 112 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the dynamic transportation matching system 112 or by an external system of a third-party system, which is separate from dynamic transportation matching system 112 and coupled to the dynamic transportation matching system 112 via a network 1304.

In particular embodiments, the dynamic transportation matching system 112 may be capable of linking a variety of entities. As an example, and not by way of limitation, the dynamic transportation matching system 112 may enable users to interact with each other or other entities, or to allow users to interact with these entities through an application programming interfaces ("API") or other communication channels.

In particular embodiments, the dynamic transportation matching system 112 may include a variety of servers, sub-systems, programs, modules, logs, and data stores. In particular embodiments, the dynamic transportation matching system 112 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile (e.g., provider profile or requester profile) store, connection store, third-party content store, or location store. The dynamic transportation matching system 112 may also include suitable components such as network interfaces, security mechanisms, load balancers, failover servers, management-and-network-operations consoles, other suitable components, or any suitable combination thereof. In particular embodiments, the dynamic transportation matching system 112 may include one or more user-profile stores for storing user profiles for transportation providers and/or transportation requesters. A user profile may include, for example, biographic information, demographic information, behavioral information, social information, or other types of descriptive information, such as interests, affinities, or location.

The web server may include a mail server or other messaging functionality for receiving and routing messages between the dynamic transportation matching system 112 and one or more client devices 1306. An action logger may be used to receive communications from a web server about a user's actions on or off the dynamic transportation matching system 112. In conjunction with the action log, a third-party-content-object log may be maintained of user exposures to third-party-content objects. A notification controller may provide information regarding content objects to a client device 1306. Information may be pushed to a client device 1306 as notifications, or information may be pulled from client device 1306 responsive to a request received from client device 1306. Authorization servers may be used to enforce one or more privacy settings of the users of the dynamic transportation matching system 112. A privacy setting of a user determines how particular information associated with a user can be shared. The authorization server may allow users to opt in to or opt out of having their actions logged by the dynamic transportation matching system 112 or shared with other systems, such as, for example, by setting appropriate privacy settings. Third-party-content-object stores may be used to store content objects received from third parties. Location stores may be used for storing location information received from client devices 1306 associated with users.

In addition, the vehicle subsystem 1308 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1308 can include an autonomous vehicle—i.e., a vehicle that does not require a human operator. In these embodiments, the vehicle subsystem 1308 can perform maneuvers, communicate, and otherwise function without the aid of a human provider, in accordance with available technology.

In particular embodiments, the vehicle subsystem 1308 may include one or more sensors incorporated therein or associated thereto. For example, sensor(s) can be mounted on the top of the vehicle subsystem 1308 or else can be located within the interior of the vehicle subsystem 1308. In certain embodiments, the sensor(s) can be located in multiple areas at once i.e., split up throughout the vehicle subsystem 1308 so that different components of the sensor(s) can be placed in different locations in accordance with optimal operation of the sensor(s). In these embodiments, the sensor(s) can include motion-related components such as an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1308 may include a communication device capable of communicating with the client device 1306 and/or the efficiency metric matching system 113. For example, the vehicle subsystem 1308 can include an on-board computing device communicatively linked to the network 1304 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
  receiving, at a transportation matching system, an indication from a requestor device of a transportation request corresponding to a destination location, wherein the transportation matching system comprises transportation servers linked via a computer network to interconnected devices including requestor devices and autonomous vehicles such that the transportation servers dynamically generate matches among the interconnected devices based on device data;
  calculating a region characteristic score based on region characteristic data indicating point densities of geographic regions, a calculated floor area ratio, or both;
  dynamically determining, by the transportation servers and using device data, device balance measure characteristics comprising current device balance data indicating a current ratio between current requestor devices and current autonomous vehicles corresponding to the geographic regions and historical device balance data indicating a historical ratio between historic requestor devices and historic autonomous vehicles corresponding to the geographic regions;

determining that the device balance measure characteristics satisfy a threshold imbalance between the current requestor devices and the current autonomous vehicles;

determining, in response to the satisfied threshold imbalance and receiving, at the transportation matching system, the indication of the transportation request, a future time window to fulfill the transportation request by using the transportation servers to predict a delivery time of an autonomous vehicle transporting the requestor device to the destination location according to the region characteristic score and the current device balance data corresponding to the geographic regions, wherein determining the future time window utilizes a time window generation machine learning model;

providing, by the transportation matching system for display via a transportation user interface of the requestor device, a first transportation option comprising an arrival time and a first transportation value and a second transportation option comprising the future time window and a second transportation value;

dynamically determining a probability of unavailable autonomous vehicles becoming available within the future time window based on the device balance measure characteristics;

determining, by the transportation matching system and in response to selection of the second transportation option, a threshold provider device efficiency metric based on the future time window, the current autonomous vehicles, the probability of the unavailable autonomous vehicles becoming available within the future time window, and a historical distribution of the historic autonomous vehicles; and providing, by the transportation matching system and based on comparing predicted provider device efficiency metrics for the current autonomous vehicles with the threshold provider device efficiency metric, navigation instructions to cause sensory components of an autonomous vehicle to perform navigational functions to fulfill the transportation request within the future time window by navigating the autonomous vehicle according to the navigation instructions.

2. The method as recited in claim 1, further comprising determining the threshold provider device efficiency metric by determining a threshold time that a potential autonomous vehicle can be without a passenger prior to fulfilling the transportation request based on the future time window, the current autonomous vehicles, and the historical distribution of the historic autonomous vehicles.

3. The method as recited in claim 1, further comprising determining the threshold provider device efficiency metric by:
determining a dispatch deadline for fulfilling the transportation request within the future time window;
determining, at a first time, a number of remaining time cycles within the future time window before the dispatch deadline; and
predicting a first threshold provider device efficiency metric for the first time based on the number of remaining time cycles, the current autonomous vehicles, and the historical distribution of the historic autonomous vehicles.

4. The method as recited in claim 3, further comprising:
determining, at a second time after the first time, an additional number of remaining time cycles within the future time window before the dispatch deadline; and
predicting a second threshold provider device efficiency metric for the second time.

5. The method as recited in claim 3, further comprising selecting the autonomous vehicle by:
predicting the provider device efficiency metrics for the current autonomous vehicles for a particular time cycle by determining estimated times that the current autonomous vehicles will be without passengers prior to fulfilling the transportation request; and
determining that a provider device efficiency metric corresponding to the autonomous vehicle satisfies the threshold provider device efficiency metric.

6. The method as recited in claim 3, further comprising determining the threshold provider device efficiency metric based on the historical distribution of the historic autonomous vehicles by generating a transition probability matrix using the historical distribution, wherein the transition probability matrix indicates probabilities of changing provider device efficiency metrics between time cycles.

7. The method as recited in claim 1, further comprising determining the current autonomous vehicles by identifying autonomous vehicles currently fulfilling different transportation requests and available to fulfill a different transportation request within a future time window.

8. The method as recited in claim 1, further comprising:
generating, using a future time window manager, future time windows corresponding to transportation requests, wherein the future time window manager generates, manages, and stores the future time windows; and
determining the future time window to fulfill the transportation request by analyzing characteristics corresponding to the geographic regions by:
determining the region characteristic data indicating the point densities of geographic regions, wherein the geographic regions comprise a region corresponding to a pickup location, the destination location, or both; or
determining the device balance measure characteristics corresponding to the region.

9. A transportation matching system comprising:
at least one processor; and
a non-transitory computer readable medium comprising instructions that, when executed by the at least one processor, cause the transportation matching system to:
receive an indication from a requestor device of a transportation request corresponding to a destination location, wherein the transportation matching system comprises transportation servers linked via a computer network to interconnected devices including requestor devices and autonomous vehicles such that the transportation servers dynamically generate matches among the interconnected devices based on device data;
calculate a region characteristic score based on region characteristic data indicating point densities of geographic regions, a calculated floor area ratio, or both;
dynamically determine, by the transportation servers and using device data, device balance measure characteristics comprising current device balance data indicating a current ratio between current requestor devices and current autonomous vehicles corresponding to the geographic regions and historical device balance data indicating a historical ratio between historic requestor devices and historic autonomous vehicles corresponding to the geographic regions;

determine that the device balance measure characteristics satisfy a threshold imbalance between the current requestor devices and the current autonomous vehicles;

determine, in response to the satisfied threshold imbalance and receiving, the indication of the transportation request, a future time window to fulfill the transportation request by using the transportation servers to predict a delivery time of an autonomous vehicle transporting the requestor device to the destination location according to the region characteristic score and the current device balance data corresponding to the geographic regions, wherein determining the future time window utilizes a time window generation machine learning model;

provide, for display via a transportation user interface of the requestor device, a first transportation option comprising an arrival time and a first transportation value and a second transportation option comprising the future time window and a second transportation value;

dynamically determine a probability of unavailable autonomous vehicles becoming available within the future time window based on the device balance measure characteristics;

determine, by the transportation matching system and in response to selection of the second transportation option, a threshold provider device efficiency metric based on the future time window, the current autonomous vehicles, the probability of the unavailable autonomous vehicles becoming available within the future time window, and a historical distribution of the historic autonomous vehicles; and provide, by the transportation matching system and based on comparing predicted provider device efficiency metrics for the current autonomous vehicles with the threshold provider device efficiency metric, navigation instructions to cause sensory components of an autonomous vehicle to perform navigational functions to fulfill the transportation request within the future time window by navigating the autonomous vehicle according to the navigation instructions.

10. The transportation matching system as recited in claim 9, further comprising instructions that, when executed by the at least one processor, cause the transportation matching system to determine the threshold provider device efficiency metric by determining a threshold time that a potential autonomous vehicle can be without a passenger prior to fulfilling the transportation request based on the future time window, the current autonomous vehicles, and the historical distribution of the historic autonomous vehicles.

11. The transportation matching system as recited in claim 9, further comprising instructions that, when executed by the at least one processor, cause the transportation matching system to determine the threshold provider device efficiency metric by:

determining a dispatch deadline for fulfilling the transportation request within the future time window;

determining, at a first time, a number of remaining time cycles within the future time window before the dispatch deadline; and predicting a first threshold provider device efficiency metric for the first time based on the number of remaining time cycles, the current autonomous vehicles, and the historical distribution of the historic autonomous vehicles.

12. The transportation matching system as recited in claim 11, further comprising instructions that, when executed by the at least one processor, cause the transportation matching system to:

determine, at a second time after the first time, an additional number of remaining time cycles within the future time window before the dispatch deadline; and predict a second threshold provider device efficiency metric for the second time.

13. The transportation matching system as recited in claim 11, further comprising instructions that, when executed by the at least one processor, cause the transportation matching system to select the autonomous vehicle by:

predicting the provider device efficiency metrics for the current autonomous vehicles for a particular time cycle by determining estimated times that the current autonomous vehicles will be without passengers prior to fulfilling the transportation request; and determining that a provider device efficiency metric corresponding to the autonomous vehicle satisfies the threshold provider device efficiency metric.

14. The transportation matching system as recited in claim 11, further comprising instructions that, when executed by the at least one processor, cause the transportation matching system to determine the threshold provider device efficiency metric based on the historical distribution of the historic autonomous vehicles by generating a transition probability matrix using the historical distribution, wherein the transition probability matrix indicates probabilities of changing provider device efficiency metrics between time cycles.

15. A non-transitory computer readable medium comprising instructions that, when executed by at least one processor, cause a computing device to:

receive, at a transportation matching system, an indication from a requestor device of a transportation request corresponding to a destination location, wherein the transportation matching system comprises transportation servers linked via a computer network to interconnected devices including requestor devices and autonomous vehicles such that the transportation servers dynamically generate matches among the interconnected devices based on device data;

calculate a region characteristic score based on region characteristic data indicating point densities of geographic regions, a calculated floor area ratio, or both;

dynamically determine, by the transportation servers and using device data, device balance measure characteristics comprising current device balance data indicating a current ratio between current requestor devices and current autonomous vehicles corresponding to the geographic regions and historical device balance data indicating a historical ratio between historic requestor devices and historic autonomous vehicles corresponding to the geographic regions;

determine that the device balance measure characteristics satisfy a threshold imbalance between the current requestor devices and the current autonomous vehicles;

determine, in response to the satisfied threshold imbalance and receiving, at the transportation matching system, the indication of the transportation request, a future time window to fulfill the transportation request by using the transportation servers to predict a delivery time of an autonomous vehicle transporting the requestor device to the destination location according to the region characteristic score and the current device balance data corresponding to the geographic regions, wherein determining the future time window utilizes a time window generation machine learning model;

provide, by the transportation matching system for display via a transportation user interface of the requestor device, a first transportation option comprising an arrival time and a first transportation value and a second transportation option comprising the future time window and a second transportation value;

dynamically determine a probability of unavailable autonomous vehicles becoming available within the future time window based on the device balance measure characteristics;

determine, by the transportation matching system and in response to selection of the second transportation option, a threshold provider device efficiency metric based on the future time window, the current autonomous vehicles, the probability of the unavailable autonomous vehicles becoming available within the future time window, and a historical distribution of the historic autonomous vehicles; and provide, by the transportation matching system and based on comparing predicted provider device efficiency metrics for the current autonomous vehicles with the threshold provider device efficiency metric, navigation instructions to cause sensory components of an autonomous vehicle to perform navigational functions to fulfill the transportation request within the future time window by navigating the autonomous vehicle according to the navigation instructions.

16. The non-transitory computer readable medium as recited in claim 15, further comprising instructions, that when executed by the at least one processor, cause the computing device to determine the current autonomous vehicles by identifying autonomous vehicles currently fulfilling different transportation requests and available to fulfill a different transportation request within the future time window.

17. The non-transitory computer readable medium as recited in claim 15, further comprising instructions, that when executed by the at least one processor, cause a future time window manager, which generates, manages, and stores future time windows corresponding to transportation requests, to determine the future time window to fulfill the transportation request by analyzing characteristics corresponding to the location by:

determining the region characteristic data indicating the point densities of geographic regions, wherein the geographic regions comprise a region corresponding to a pickup location, the destination location, or both; or determining the device balance measure characteristics corresponding to the region.

18. The non-transitory computer readable medium as recited in claim 15, further comprising instructions, that when executed by the at least one processor, cause the computing device to determine the threshold provider device efficiency metric by determining a threshold time that a potential autonomous vehicle can be without a passenger prior to fulfilling the transportation request based on the future time window, the current autonomous vehicles, and the historical distribution of the historic autonomous vehicles.

19. The non-transitory computer readable medium as recited in claim 15, further comprising instructions, that when executed by the at least one processor, cause the computing device to determine the threshold provider device efficiency metric by:

determining a dispatch deadline for fulfilling the transportation request within the future time window;

determining, at a first time, a number of remaining time cycles within the future time window before the dispatch deadline; and predicting a first threshold provider device efficiency metric for the first time based on the number of remaining time cycles, the current autonomous vehicles, and the historical distribution of the historic autonomous vehicles.

20. The non-transitory computer readable medium as recited in claim 19, further comprising instructions, that when executed by the at least one processor, cause the computing device to:

determine, at a second time after the first time, an additional number of remaining time cycles within the future time window before the dispatch deadline; and predict a second threshold provider device efficiency metric for the second time.

* * * * *